US009293235B2

United States Patent
Yamamoto et al.

(10) Patent No.: US 9,293,235 B2
(45) Date of Patent: Mar. 22, 2016

(54) LITHIUM TITANATE PARTICLES AND PROCESS FOR PRODUCING THE LITHIUM TITANATE PARTICLES, MG-CONTAINING LITHIUM TITANATE PARTICLES AND PROCESS FOR PRODUCING THE MG-CONTAINING LITHIUM TITANATE PARTICLES, NEGATIVE ELECTRODE ACTIVE SUBSTANCE PARTICLES FOR NON-AQUEOUS ELECTROLYTE SECONDARY BATTERIES, AND NON-AQUEOUS ELECTROLYTE SECONDARY BATTERY

(75) Inventors: Akinori Yamamoto, Hiroshima-ken (JP); Tomoko Okita, Hiroshima-ken (JP); Hiroshi Yamamoto, Hiroshima-ken (JP); Kohji Mori, Yamaguchi-ken (JP); Kazumichi Koga, Yamaguchi-ken (JP); Akihisa Kajiyama, Yamagushi-ken (JP)

(73) Assignee: TODA KOGYO CORPORATION, Hiroshima (JP)

( * ) Notice: Subject to any disclaimer, the term of this patent is extended or adjusted under 35 U.S.C. 154(b) by 116 days.

(21) Appl. No.: 13/819,068
(22) PCT Filed: Aug. 29, 2011
(86) PCT No.: PCT/JP2011/069407
§ 371 (c)(1),
(2), (4) Date: May 30, 2013
(87) PCT Pub. No.: WO2012/029697
PCT Pub. Date: Mar. 8, 2012

(65) Prior Publication Data
US 2013/0244114 A1 Sep. 19, 2013

(30) Foreign Application Priority Data

Aug. 31, 2010 (JP) ................. 2010-194923
Sep. 24, 2010 (JP) ................. 2010-214368
Mar. 31, 2011 (JP) ................. 2011-080027

(51) Int. Cl.
*H01B 1/08* (2006.01)
*H01M 4/485* (2010.01)
*C01G 23/00* (2006.01)
*H01M 10/0525* (2010.01)

(52) U.S. Cl.
CPC ................ *H01B 1/08* (2013.01); *C01G 23/005* (2013.01); *C01G 23/006* (2013.01); *H01M 4/485* (2013.01);
(Continued)

(58) Field of Classification Search
CPC .... H01B 1/08; H01M 4/485; H01M 10/0525; C01G 23/005
USPC .............. 252/518, 1, 520.2, 520.21; 429/231, 429/218.1
See application file for complete search history.

(56) References Cited

U.S. PATENT DOCUMENTS 6,645,673 B2 * 11/2003 Yamawaki et al. ......... 429/231.5
8,114,469 B2 * 2/2012 Zaghib et al. ................ 427/122

(Continued)

FOREIGN PATENT DOCUMENTS

JP 2001-213622 8/2001
JP 2001-240498 9/2001

(Continued)

OTHER PUBLICATIONS

Li et al "Preparation of Li4Ti5O12 nanorods . . . ", Journ. Electrochem. Soc., 156 (7) A495-499 (2009).*

(Continued)

*Primary Examiner* — Mark Kopec
(74) *Attorney, Agent, or Firm* — Nixon & Vanderhye P.C.

(57) ABSTRACT

According to the present invention, there are provided lithium titanate particles which exhibit an excellent initial discharge capacity and an enhanced high-efficiency discharge capacity retention rate as an active substance for non-aqueous electrolyte secondary batteries and a process for producing the lithium titanate particles, and Mg-containing lithium titanate particles.

6 Claims, 3 Drawing Sheets

(52) U.S. Cl.
CPC ......... *C01P 2002/32* (2013.01); *C01P 2002/60* (2013.01); *C01P 2002/72* (2013.01); *C01P 2002/76* (2013.01); *C01P 2002/77* (2013.01); *C01P 2004/03* (2013.01); *C01P 2004/80* (2013.01); *C01P 2006/12* (2013.01); *H01M 10/0525* (2013.01); *Y02E 60/122* (2013.01)

(56) References Cited

U.S. PATENT DOCUMENTS

| | | | |
|---|---|---|---|
| 8,541,137 | B2 | 9/2013 | Inagaki et al. |
| 2004/0202934 | A1* | 10/2004 | Zaghib et al. ............... 429/231.1 |
| 2006/0257746 | A1* | 11/2006 | Inagaki et al. ............. 429/231.5 |
| 2008/0113264 | A1* | 5/2008 | Inagaki et al. ................ 429/156 |
| 2008/0149882 | A1* | 6/2008 | Terazono et al. .......... 252/62.59 |
| 2009/0081551 | A1 | 3/2009 | Hoshina et al. |
| 2009/0269668 | A1 | 10/2009 | Endo et al. |
| 2010/0054981 | A1* | 3/2010 | Liu ................................ 419/19 |
| 2011/0059366 | A1 | 3/2011 | Eom |
| 2011/0189545 | A1* | 8/2011 | Holzapfel et al. ......... 429/231.1 |
| 2011/0223491 | A1* | 9/2011 | Xu et al. ....................... 429/338 |
| 2011/0262809 | A1 | 10/2011 | Kumagai et al. |
| 2012/0037858 | A1* | 2/2012 | Kim et al. ................. 252/519.12 |
| 2014/0209834 | A1 | 7/2014 | Holzapfel et al. |

FOREIGN PATENT DOCUMENTS

| | | |
|---|---|---|
| JP | 2002-008658 | 1/2002 |
| JP | 2002-270175 | 9/2002 |
| JP | 2008-277000 | 11/2008 |
| JP | 2009-081049 | 4/2009 |
| JP | 2011-060764 | 3/2011 |
| JP | 2011-521881 | 7/2011 |
| JP | 2011/154928 | 8/2011 |
| JP | 2011-154928 | 8/2011 |
| WO | WO 2006/106701 | 10/2006 |
| WO | WO 2009/146904 | 12/2009 |

OTHER PUBLICATIONS

Mohammadi et al "Low termperature nanstructured lithium titanates . . . ", J Sol-Del Sci Technol (2010) 55:19-35.*
Gualtieri "A guided training exercise of quantitative phase analysis using EXPGUI", www.ccp14.ac.uk (no pub date).*
International Search Report for PCT/JP2011/069407 mailed Nov. 29, 2011.
Nakai et al. (ed), Practice of X-Ray Powder Diffraction Analysis—Introduction of Rietveld Analysis, p. 162 (2005) (with partial translation).

* cited by examiner

LITHIUM TITANATE PARTICLES AND PROCESS FOR PRODUCING THE LITHIUM TITANATE PARTICLES, MG-CONTAINING LITHIUM TITANATE PARTICLES AND PROCESS FOR PRODUCING THE MG-CONTAINING LITHIUM TITANATE PARTICLES, NEGATIVE ELECTRODE ACTIVE SUBSTANCE PARTICLES FOR NON-AQUEOUS ELECTROLYTE SECONDARY BATTERIES, AND NON-AQUEOUS ELECTROLYTE SECONDARY BATTERY

This application is the U.S. national phase of International Application No. PCT/JP2011/069407 filed 29 Aug. 2011 which designated the U.S. and claims priority to JP 2010-194923 filed 31 Aug. 2010, JP 2010-214368 filed 24 Sep. 2010, and JP 2011-080027 filed 31 Mar. 2011, the entire contents of each of which are hereby incorporated by reference.

TECHNICAL FIELD

The present invention provides lithium titanate particles which exhibit an excellent initial discharge capacity and an enhanced high-efficiency discharge capacity retention rate (output characteristic) as a negative electrode active substance for non-aqueous electrolyte secondary batteries and a process for producing the lithium titanate particles, and a non-aqueous electrolyte secondary battery using the negative electrode active substance.

Also, the present invention provides lithium titanate particles which exhibit an excellent high-efficiency discharge capacity retention rate (output characteristic) as a negative electrode active substance for non-aqueous electrolyte secondary batteries, and a non-aqueous electrolyte secondary battery using the lithium titanate particles as a negative electrode active substance.

Also, the present invention provides a process for producing lithium titanate particles which exhibit an excellent initial discharge capacity and an enhanced high-efficiency discharge capacity retention rate as a negative electrode active substance for non-aqueous electrolyte secondary batteries in an inexpensive simple manner.

Further, the present invention provides Mg-containing lithium titanate particles which exhibit an excellent initial discharge capacity and an enhanced high-efficiency discharge capacity retention rate as a negative electrode active substance for non-aqueous electrolyte secondary batteries.

BACKGROUND ART

With the recent rapid development of portable and cordless electronic devices such as audio-visual (AV) devices and personal computers, there is an increasing demand for secondary batteries or cells having a small size, a light weight and a high energy density as a power source for driving these electronic devices. Under these circumstances, lithium ion secondary batteries having advantages such as a high charge/discharge voltage and a large charge/discharge capacity have been noticed.

In the lithium ion secondary batteries, in recent years, it is known that lithium titanate is used as a negative electrode active substance (Patent Document 1).

It is known that the lithium titanate: $Li_4Ti_5O_{12}$ provides a negative electrode active substance having a high structural stability and a high reliability because the lithium titanate exhibits a much less change in crystal structure even when subjected to insertion and desorption reactions of lithium ions upon charging and discharging operations.

Hitherto, there is known a so-called solid state reaction method (dry method) as the method for producing lithium titanate ($Li_4Ti_5O_{12}$) in which mixed particles prepared by dry-mixing or wet-mixing a lithium salt and an oxide of titanium such that an Li/Ti ratio therein is 0.80 (a simple mixture of the lithium salt and the oxide of titanium) are heated and calcined to obtain $Li_4Ti_5O_{12}$ (Patent Documents 1, 6, 8 and 9).

On the other hand, there is also known the method (wet-method) including a liquid phase reaction and a solid state reaction in which a mixture of titanium and lithium is subjected hydrothermal treatment and then heated and calcined to obtain $Li_4Ti_5O_{12}$ (Patent Documents 3 and 4).

In addition, in Patent Document 5, it is described that as a result of XRD of lithium titanate, a peak intensity ratio of $TiO_2$ to $Li_4Ti_5O_{12}$ and a peak intensity ratio of $Li_2TiO_3$ to $Li_4Ti_5O_{12}$ both are not more than 7, preferably not more than 3 and more preferably not more than 1, and that as the amounts of these impurity phases are reduced, a diffusion rate of lithium ions is increased and an ionic conductivity and a heavy-current characteristic (high-efficiency discharge capacity retention rate) thereof are enhanced.

Also, in Patent Document 5, it is described that as the crystallite size of the lithium titanate is reduced or as the amounts of these impurity phases are reduced, a diffusion rate of lithium ions is increased and an ionic conductivity and a heavy-current characteristic (high-efficiency discharge capacity retention rate) thereof are enhanced.

Further, as a method similar to the above solid state reaction method, there is also known the production process in which a slurry comprising an oxide of titanium, a titanic acid compound (such as m-titanic acid, o-titanic acid or a mixture thereof) and a lithium salt is dried and granulated, and then heated and calcined (Patent Documents 10 and 11).

On the other hand, there is also known the process for producing lithium titanate ($Li_4Ti_5O_{12}$) comprising a step of reacting a titanium compound with an ammonium compound in water to obtain a titanic acid compound; a step of reacting the titanic acid compound with a lithium compound in water to obtain lithium titanate hydrate; and a step of dehydrating the lithium titanate hydrate under heating (Patent Document 3).

Also, the lithium titanate ($Li_4Ti_5O_{12}$) has such a problem that a high-efficiency discharge capacity retention rate thereof is low owing to a high electrical insulating property thereof.

On the other hand, it is known that a part of lithium and/or titanium of lithium titanate ($Li_4Ti_5O_{12}$) is substituted with a transition metal such as Fe (Patent Document 12) and Cu (Patent Document 13) or the other metals (Patent Documents 14 to 16) in order to improve various properties of the lithium titanate.

In addition, in Patent Document 17, there is described the invention concerning an active substance for a lithium ion secondary battery which has a composition represented by the formula: $Li[Li_{(1-2x)/3}Mg_xTi_{(5-x)/3}]O_4$ ($0<x\leq\frac{1}{2}$).

PRIOR ART DOCUMENTS

Patent Documents

Patent Document 1: Japanese Patent Application Laid-open (KOKAI) No. 2001-192208

Patent Document 2: Japanese Patent Application Laid-open (KOKAI) No. 2001-213622

Patent Document 3: Japanese Patent Application Laid-open (KOKAI) No. 9-309727 (1997)

Patent Document 4: Japanese Patent Application Laid-open (KOKAI) No. 2010-228980

Patent Document 5: Japanese Patent Application Laid-open (KOKAI) No. 2006-318797

Patent Document 6: Japanese Patent Application Laid-open (KOKAI) No. 2003-137547

Patent Document 7: Japanese Patent Application Laid-open (KOKAI) No. 11-283624 (1999)

Patent Document 8: Japanese Patent Application Laid-open (KOKAI) No. 6-275263 (1994)

Patent Document 9: Japanese Patent Application Laid-open (KOKAI) No. 2001-240498

Patent Document 10: Japanese Patent Application Laid-open (KOKAI) No. 2005-239460

Patent Document 11: Japanese Patent Application Laid-open (KOKAI) No. 2005-239461

Patent Document 12: Japanese Patent Application Laid-open (KOKAI) No. 2001-185141

Patent Document 13: Japanese Patent Application Laid-open (KOKAI) No. 2001-250554

Patent Document 14: Japanese Patent Application Laid-open (KOKAI) No. 2000-156229

Patent Document 15: Japanese Patent Application Laid-open (KOKAI) No. 2004-235144

Patent Document 16: Japanese Patent Application Laid-open (KOKAI) No. 10-251020 (1998)

Patent Document 17: PCT Pamphlet WO 2006/106701

SUMMARY OF THE INVENTION

Problem to be Solved by the Invention

In the above conventionally reported techniques which aim at increasing a purity of $Li_4Ti_5O_{12}$ as a final composition, it is known that as the purity of $Li_4Ti_5O_{12}$ is increased, battery characteristics are enhanced.

Even though the contents of the impurity phases in the lithium titanate particles are reduced to a level as low as possible to obtain lithium titanate particles having a high purity of $Li_4Ti_5O_{12}$ as described in Patent Document 5, lithium titanate particles suitable as a negative electrode active substance which are capable of exhibiting a high initial discharge capacity and an excellent output characteristic (high-efficiency discharge capacity retention rate) and suppressing generation of gases have not been obtained until now.

Under these circumstances, according to the Invention 1, a first object of the present invention is to provide a negative electrode active substance capable of exhibiting a high initial discharge capacity and an excellent output characteristic (high-efficiency discharge capacity retention rate) and suppressing generation of gases even when the contents of impurity phases in lithium titanate particles are reduced to a level as low as possible to obtain such lithium titanate particles having a high purity of $Li_4Ti_5O_{12}$. The present inventors have noticed the contents of $TiO_2$ and $Li_2TiO_3$ in $Li_4Ti_5O_{12}$ as the aimed product. As a result of the present inventors' earnest study, it has been found that aside from such a conventional knowledge that a purity of $Li_4Ti_5O_{12}$ is to be enhanced, when a specific amount of $Li_2TiO_3$ is allowed to be present in the lithium titanate particles and a specific surface area thereof as measured by BET method is adjusted to a limited range, it is possible to obtain batteries having excellent characteristics which are excellent in any of initial discharge capacity, output characteristic (high-efficiency discharge capacity retention rate) and prevention of generation of gases. The Invention 1 which is capable of achieving the first object has been attained on the basis of this finding.

Hitherto, it has been reported that in order to improve battery characteristics, in particular, an output characteristic (high-efficiency discharge capacity retention rate), reduction in size of primary particles or secondary particles to form fine particles is effective. Therefore, the particle diameter or specific surface area (BET method) of the particles has been conventionally controlled.

In recent years, lithium titanate capable of exhibiting a high initial capacity and improving an output characteristic (high-efficiency discharge capacity retention rate) to a higher level than conventionally has been strongly required. It has been therefore demanded to provide the lithium titanate in the form of still finer particles.

However, when it is intended to achieve an excellent output characteristic (high-efficiency discharge capacity retention rate), there have frequently occurred the cases in which even though finer particles are obtained, the output characteristic (high-efficiency discharge capacity retention rate) thereof are not improved but rather deteriorated, and the deterioration in output characteristic tends to be caused irrespective of a particle diameter or specific surface area thereof.

Under these circumstances, in accordance with the Invention 2, a second object of the present invention is to obtain lithium titanate particles which have a high initial capacity and can be more highly improved in output characteristic (high-efficiency discharge capacity retention rate) than conventionally.

Further, it has been strongly required to provide a process for producing lithium titanate particles as an active substance for non-aqueous secondary batteries which exhibit an excellent initial discharge capacity and an excellent output characteristic (high-efficiency discharge capacity retention rate) in an inexpensive simple manner. However, such a production process has not been obtained until now.

That is, in the production processes described in Patent Documents 1 and 6 to 8, mixed particles prepared by dry-mixing or wet-mixing a lithium salt and an oxide of titanium at a mixing ratio of Li/Ti=0.80 (a simple mixture of the lithium salt and the oxide of titanium) are calcined under heating to obtain $Li_4Ti_5O_{12}$. These production processes are generally known as a solid state reaction method. In order to obtain an $Li_4Ti_5O_{12}$ type spinel single phase, it has been frequently required to use the method in which a high-temperature calcination step is conducted, or calcination and pulverization steps are repeated two or more times. Therefore, it may be difficult to obtain lithium titanate $Li_4Ti_5O_{12}$ fine particles having a uniform composition comprising a spinel structure single phase. Thus, when using the above conventional lithium titanate particles as a negative electrode active substance for lithium ion secondary batteries, it may be difficult to attain an excellent initial discharge capacity and a high output characteristic (high-efficiency discharge capacity retention rate).

The production processes as described in Patent Documents 9 and 10, i.e., the processes for producing lithium titanate which include the steps of drying and granulating a slurry comprising a titanium compound and a lithium compound (a lithium salt) and then heating and calcining the obtained particles, are characterized in that the titanium compound comprising at least a titanic acid compound (such as o-titanic acid and m-titanic acid) is added to a lithium salt solution preheated to a temperature of not higher than 100° C.

to prepare the above slurry. These production processes aim at obtaining lithium titanate in the form of large particles having a high tap density by heating and calcining the precursor obtained by the drying and granulation. When the tap density of the particles increases, a packing property of the particles is improved, so that it is expected to enhance an electrode density. However, on the other hand, it tends to be difficult to ensure a good conductivity between primary particles within the granulated secondary particles. Therefore, in particular, it tends to be very difficult to enhance an output characteristic (high-efficiency discharge capacity retention rate) of the resulting particles. For this reason, the production processes described in Patent Documents 9 and 10 tend to fail to provide a process capable of imparting an excellent initial discharge capacity and exhibiting a sufficient effect of enhancing the output characteristic (high-efficiency discharge capacity retention rate).

Also, in the production process described in Patent Document 3, a step of reacting a titanium compound with an ammonium compound in water to obtain a titanic acid compound, a step of reacting the titanic acid compound with a lithium compound in water to obtain a lithium titanate hydrate, and a step of subjecting the lithium titanate hydrate to dehydration under heating are conducted to obtain thin scale- or plate-shaped lithium titanate $Li_4Ti_5O_{12}$ fine particles. The lithium titanate particles obtained in this synthesis process are characterized by having an extremely thin plate shape and a porous structure.

On the other hand, upon production of electrodes of lithium ion secondary batteries, it is generally known that a coating material prepared by dispersing lithium titanate particles as an active substance in an organic solvent is applied and formed into a sheet-like coating layer. However, the above fine particles characterized by having an extremely thin plate shape and a porous structure are considerably disadvantageous when dispersed in the coating material. Therefore, it tends to be difficult for the above fine particles to exhibit a sufficient charge/discharge performance inherent to an active substance.

Further, in the production process, it is required to conduct the two reaction steps in water. Therefore, the above conventional production process tends to fail to provide an advantageous production process in view of both costs and productivity.

Under these circumstances, according to the Invention 3, a third object of the present invention is to produce lithium titanate particles as an active substance for non-aqueous electrolyte secondary batteries which have an excellent initial discharge capacity and a high output characteristic (high-efficiency discharge capacity retention rate) by using an inexpensive and simple process.

In addition, at present, it has been strongly required to provide lithium titanate particles as the above active substance for non-aqueous electrolyte secondary batteries which have an excellent initial discharge capacity and a high output characteristic (high-efficiency discharge capacity retention rate). However, such particles have not been obtained until now.

That is, in Patent Document 6, lithium titanate $Li_4Ti_5O_{12}$ is used as a negative electrode active substance for lithium ion secondary batteries, but is not improved in electronic conductivity. Therefore, the battery using such a substance can hardly exhibit a high output characteristic (high-efficiency discharge capacity retention rate).

Also, lithium titanate obtained by substituting a part of lithium and/or titanium of $Li_4Ti_5O_{12}$ with a transition metal as described in Patent Documents 11 to 13 is improved in electronic conductivity as a negative electrode active substance. However, such a substance tends to hardly exhibit a sufficient effect of enhancing an output characteristic (high-efficiency discharge capacity retention rate).

Also, in Patent Document 14, there is described lithium titanate obtained by substituting a part of lithium of $Li_4Ti_5O_{12}$ with magnesium. However, the resulting material tends to hardly exhibit a sufficient effect of enhancing an output characteristic (high-efficiency discharge capacity retention rate) probably owing to the production process (magnesium substitution method).

Also, in Patent Document 15, it is described that a part of lithium in lithium titanate is substituted with magnesium, but there is described no Example concerning the substitution. Further, since the object of the substitution is not to improve an output characteristic (high-efficiency discharge capacity retention rate), the effect of enhancing the output characteristic may be insufficient.

Also, in Patent Document 16, there is described the invention concerning an active substance for lithium ion batteries which has a composition of $Li[Li_{(1-2x)/3}Mg_xTi_{(5-x)/3}]O_4$ ($0<x\le\frac{1}{2}$). In this invention, it is also described that when substituted in an amount of up to $x=\frac{1}{4}$, a single phase with a spinel structure is obtained. However, as recognized from X-ray diffraction pattern shown in Examples of Patent Document 16, the peak attributed to any impurity phase is apparently seen in the X-ray diffraction pattern probably owing to the production process (magnesium substitution method). Therefore, in Patent Document 16, there are present contradictory descriptions.

That is, when the magnesium substitution is carried out by the synthesis method described in Patent Document 17, formation of a single phase having a spinel structure tends to be incomplete so that it may be difficult to attain a sufficient effect of enhancing an initial discharge capacity and an output characteristic (high-efficiency discharge capacity retention rate).

Under these circumstances, according to the Invention 4, a fourth object of the present invention is to obtain lithium titanate particles having an excellent initial discharge capacity and a high output characteristic (high-efficiency discharge capacity retention rate) as an active substance for non-aqueous electrolyte secondary batteries.

Means for Solving the Problem

The above first object or technical task of the present invention can be achieved by the following aspects of the Invention 1.

That is, according to the Invention 1, there are provided lithium titanate particles with a spinel structure comprising $TiO_2$ in an amount of not more than 1.5%, $Li_2TiO_3$ in an amount of not less than 1% and not more than 6%, and $Li_4Ti_5O_{12}$ in an amount of not less than 94% and not more than 99% as determined according to a Rietveld analysis when indexed with Fd-3m by XRD, and having a specific surface area of 7 to 15 m$^2$/g as measured by BET method (Invention 1-1).

Also, according to the Invention 1, there are provided the lithium titanate particles as described in the above Invention 1-1, wherein a ratio (molar ratio) of Li to Ti (Li/Ti) in the particles is 0.805 to 0.83 (Invention 1-2).

Also, according to the Invention 1, there are provided a process for producing the lithium titanate particles as described in the above Invention 1-1 or 1-2, comprising the step of calcining a mixture comprising at least $Li_2TiO_3$ and $TiO_2$ at a temperature of not lower than 650° C. and lower than 800° C. (Invention 1-3).

Also, according to the Invention 1, there are provided negative electrode active substance particles comprising the lithium titanate particles as described in the above Invention 1-1 or 1-2 (Invention 1-4).

Also, according to the Invention 1, there are provided the negative electrode active substance particles for non-aqueous electrolyte secondary batteries as described in the above Invention 1-4, wherein in a cell comprising the negative electrode active substance and metallic lithium as a counter electrode, when a charging direction of the cell is the direction in which lithium is released (i.e., the direction in which a voltage of the cell is increased), an initial discharge capacity of the cell is not less than 165 mAh/g, and an output characteristic (high-efficiency discharge capacity retention rare) of the cell as a discharge capacity ratio between 10 C and 0.1 C assuming that a C-rate upon measurement of the initial discharge capacity is 0.1 C is not less than 80% (Invention 1-5).

Also, according to the Invention 1, there is provided a non-aqueous electrolyte secondary battery comprising the negative electrode active substance particles as described in the above Invention 1-4 or 1-5 (Invention 1-6).

The above second object or technical task of the present invention can be achieved by the following aspects of the Invention 2.

That is, according to the Invention 2, there are provided lithium titanate particles with a spinel structure, having a crystal distortion of not more than 0.0015 as determined according to a Rietveld analysis of XRD pattern of the lithium titanate particles, and a crystallite size of 80 to 300 nm (Invention 2-1).

Also, according to the Invention 2, there are provided negative electrode active substance particles for non-aqueous electrolyte secondary batteries comprising the lithium titanate particles as described in the above Invention 2-1 (Invention 2-2).

Also, according to the Invention 2, there are provided the negative electrode active substance particles for non-aqueous electrolyte secondary batteries as described in the above Invention 2-2 which are used in the form of a composition comprising 90 parts by weight of the negative electrode active substance particles, 5 parts by weight of a conductive assistant, and 5 parts by weight of a binder, wherein in a cell comprising the negative electrode active substance particles in the form of the composition and metallic lithium as a counter electrode, when a charging direction of the cell is the direction in which lithium is released, an initial discharge capacity of the cell is not less than 165 mAh/g, and an output characteristic of the cell as a discharge capacity ratio between 10 C and 0.1 C assuming that a C-rate upon measurement of the initial discharge capacity is 0.1 C is not less than 85% (Invention 2-3).

Also, according to the Invention 2, there is provided a non-aqueous electrolyte secondary battery comprising the negative electrode active substance particles as described in the above Invention 2-2 or 2-3 (Invention 2-4).

The above third object or technical task of the present invention can be achieved by the following aspects of the Invention 3.

That is, according to the Invention 3, there is provided a process for producing lithium titanate particles comprising the steps of:

adding and mixing a water-soluble lithium solution into a water suspension of an oxide of titanium having a BET specific surface area of 40 to 400 m²/g and a primary particle diameter of 5 to 50 nm and subjecting the resulting mixed suspension to aging reaction at a temperature of 50 to 100° C.;

subjecting the resulting reaction product to filtration, drying and pulverization; and subjecting the obtained dry particles to heat-calcination treatment at a temperature of 550 to 800° C. (Invention 3-1).

Also, according to the Invention 3, there is provided a non-aqueous electrolyte secondary battery comprising an electrode comprising the lithium titanate particles produced by the process as described in the above Invention 3-1 as an active substance (Invention 3-2).

The above fourth object or technical task of the present invention can be achieved by the following aspects of the Invention 4.

That is, according to the Invention 4, there are provided Mg-containing lithium titanate particles having a composition represented by the formula:

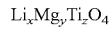

wherein x, z>0; 0.01≤y≤0.20; 0.01≤y/z≤0.10; and 0.5≤(x+y)/z≤1.0, the Mg-containing lithium titanate particles having a BET specific surface area of 5 to 50 m²/g, a spinel single phase as a crystal structure, and a lattice constant (a) represented by a value of 0.050y+8.3595<a≤0.080y+8.3595 (Å) (Invention 4-1).

Also, according to the Invention 4, there is provided a process for producing the Mg-containing lithium titanate particles as described in the above Invention 4-1 comprising the steps:

adding and mixing a water-soluble lithium solution, and a water-soluble Mg salt solution or Mg(OH)₂ particles into a water suspension of an oxide of titanium and subjecting the resulting mixed suspension to aging reaction at a temperature of not higher than 100° C.;

subjecting the resulting reaction product to filtration, drying and pulverization; and subjecting the resulting dry particles to heat-calcination treatment (Invention 4-2).

Also, according to the Invention 4, there are provided the Mg-containing lithium titanate particles as described in the above Invention 4-1 comprising carbon that is allowed to be present on a surface of the respective particles (Invention 4-3).

Also, according to the Invention 4, there is provided a non-aqueous electrolyte secondary battery comprising an electrode comprising the Mg-containing lithium titanate particles as described in the above Invention 4-1 or 4-3 as an active substance (Invention 4-4).

Effects of the Invention

The lithium titanate particles according to the Invention 1 are capable of exhibiting well-balanced battery characteristics including an excellent initial discharge capacity and a high output characteristic (excellent high-efficiency discharge capacity retention rate) as well as suppressed generation of gases when used as negative electrode active substance particles in non-aqueous electrolyte secondary batteries, and therefore can be suitably used as active substance particles for non-aqueous electrolyte secondary batteries.

The lithium titanate particles according to the Invention 2 are in the form of a compound having adequate crystal distortion and crystallite size and capable of exhibiting an excellent initial discharge capacity and a high output characteristic (excellent high-efficiency discharge capacity retention rate) when used in non-aqueous electrolyte secondary batteries, and therefore can be suitably used as active substance particles for non-aqueous electrolyte secondary batteries.

When using the lithium titanate particles produced by the production process according to the Invention 3, it is possible to obtain a non-aqueous electrolyte secondary battery capable of exhibiting an excellent initial discharge capacity and a high output characteristic (high-efficiency discharge capacity retention rate) as required for a secondary battery.

When using the Mg-containing lithium titanate particles according to the Invention 4, it is possible to obtain a non-aqueous electrolyte secondary battery capable of exhibiting an excellent initial discharge capacity and a high output characteristic (high-efficiency discharge capacity retention rate) as required for a secondary battery.

PREFERRED EMBODIMENTS FOR CARRYING OUT THE INVENTION

Figure 1:
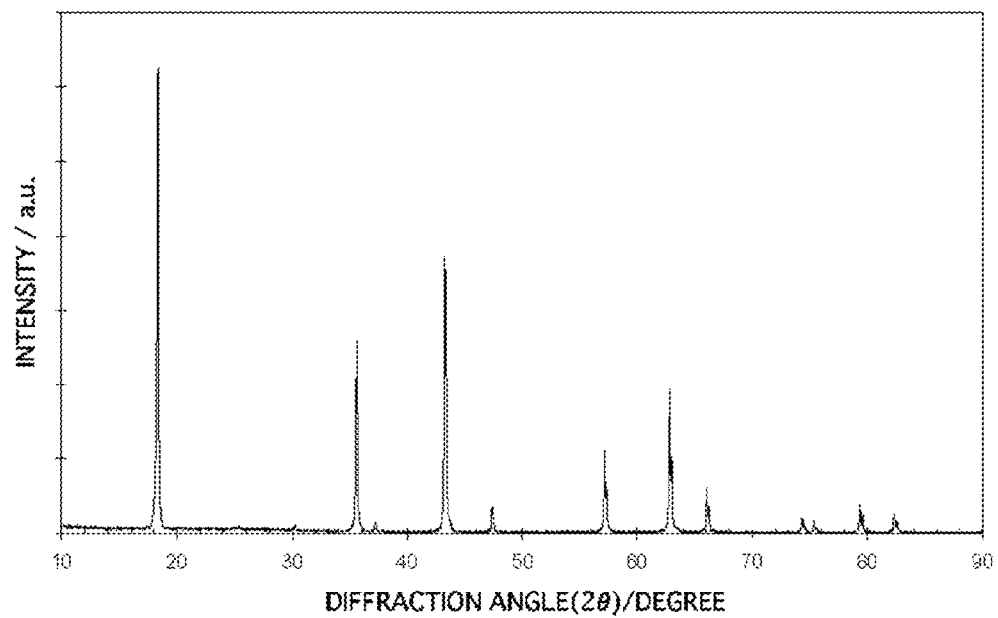
FIG. 1 is an XRD pattern of lithium titanate particles obtained in Example 1-1.
Figure 2:
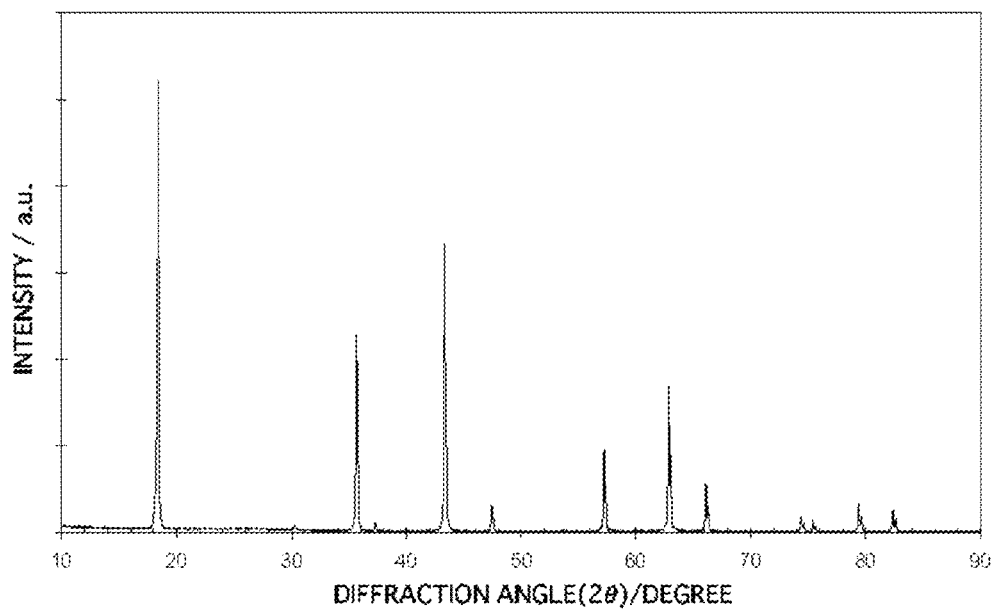
FIG. 2 is an XRD pattern of lithium titanate particles obtained in Example 1-6.
Figure 3:
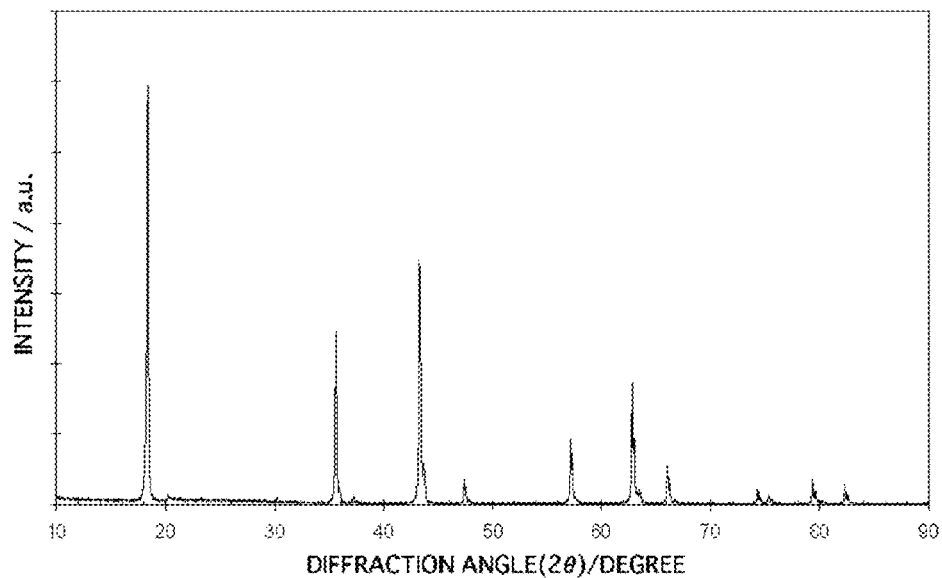
FIG. 3 is an XRD pattern of lithium titanate particles obtained in Comparative Example 1-2.
Figure 4:
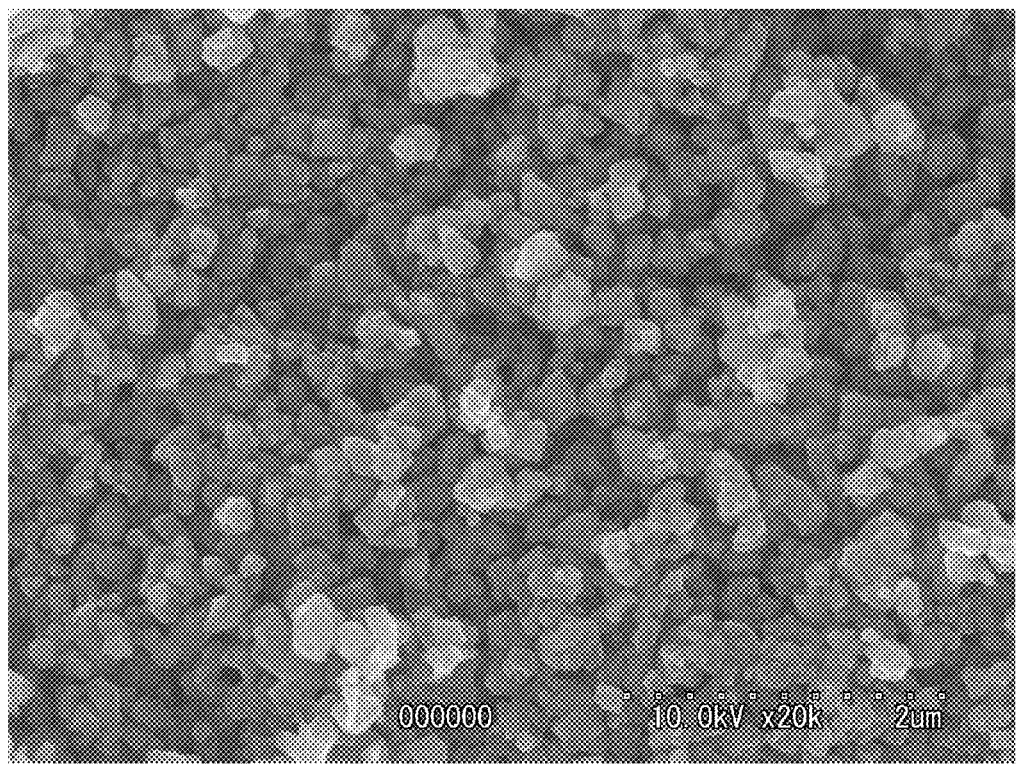
FIG. 4 is a scanning electron micrograph of lithium titanate particles obtained in Example 1-2.

First, the construction of the Invention 1 is described in more detail below.

The lithium titanate particles according to the Invention 1 have at least a spinel structure, and is in the form of a compound represented by the general chemical formula: $Li_4Ti_5O_{12}$ containing at least $Li_2TiO_3$.

The condition of $Li_2TiO_3$ present in the lithium titanate particles according to the Invention 1 is not particularly limited as long as the content thereof lies within the specific range as defined in the present invention, and $Li_2TiO_3$ may be present in such a state as coated on the surface of the respective particles or in the form of islands in the respective particles, or may have any shape within the respective particles.

In the lithium titanate particles according to the Invention 1, the diffraction between 10 to 90 degrees (2θ/θ) as measured by XRD can be indexed with Fd-3m. By performing a Rietveld analysis from the XRD pattern, it is possible to quantitatively determine amounts of $TiO_2$ and $Li_2TiO_3$ which remain in the particles. In the Invention 1, $TiO_2$ is present in an amount of not more than 1.5%, and $Li_2TiO_3$ is present in an amount of 1.0 to 6.0%. When the amount of $TiO_2$ present in the particles is more than 1.5%, the obtained particles tend to be deteriorated in output characteristic (high-efficiency discharge capacity retention rate). When the amount of $Li_2TiO_3$ present in the particles is less than 1.0%, the secondary battery produced using the lithium titanate particles as negative electrode active substance particles has good initial discharge capacity and output characteristic (high-efficiency discharge capacity retention rate). However, as described hereinlater in Comparative Examples, a large amount of gases tend to be generated. When the amount of $Li_2TiO_3$ present in the particles is more than 6.0%, the secondary battery produced using the lithium titanate particles as negative electrode active substance particles tends to exhibit a low initial discharge capacity, and therefore tend to be incapable of satisfying a high capacity of not less than 165 mAh/g. The amount of $TiO_2$ present in the lithium titanate particles is preferably not more than 1.0%, and the amount of $Li_2TiO_3$ present in the lithium titanate particles is preferably 1.5 to 5.0%. The amount of $TiO_2$ present in the lithium titanate particles is more preferably not more than 0.5%, and the amount of $Li_2TiO_3$ present in the lithium titanate particles is more preferably 2.0 to 4.0%.

In the Invention 1, it is important that when performing a Rietveld analysis of the lithium titanate particles, $Li_2TiO_3$ is present in the lithium titanate particles. When $Li_2TiO_3$ is present in a specific amount range within the respective particles or in a surface layer of the respective particles, it is considered to attain the following three main effects.

The first point resides in that in the case where $Li_2TiO_3$ is present within the respective lithium titanate particles or in a surface layer of the respective particles, it is considered that distortion of a crystal lattice thereof becomes small when subjected to high-speed charge/discharge cycles. For this reason, it is considered that a good output characteristic (high-efficiency discharge capacity retention rate) can be obtained.

The second point resides in that in the case where $Li_2TiO_3$ is present within the respective lithium titanate particles according to the Invention 1 or in a surface layer of the respective particles, it is considered that a kind of defect (such as point defect and plane defect) is generated in the particles. For this reason, it is considered that a point of ill-balance in valence of $Li_4Ti_5O_{12}$ as a whole is generated, so that the lithium titanate particles according to the Invention 1 can exhibit a high electrical conductivity as compared to pure lithium titanate particles. Therefore, it is considered that the resulting particles can be enhanced in output characteristic (high-efficiency discharge capacity retention rate).

The third point resides in that in the case where $Li_2TiO_3$ is present within the respective lithium titanate particles or in a surface layer of the respective particles, when lithium titanate is fully charged and transformed into $Li_7Ti_5O_{12}$, site points at which $Li_2TiO_3$ is still present remain in the particles although they are not present over an entire portion of the particles, so that it is considered that generation of gases can be suppressed.

The lithium titanate particles according to the Invention 1 preferably have a primary particle diameter of 0.1 to 0.4 μm. According to the Invention 1, it has been found that the primary particle diameter of the lithium titanate particles gives a large influence on an output characteristic of the resulting battery. When the primary particle diameter of the lithium titanate particles is less than the above-specified range of the Invention 1, the crystal structure thereof tends to be unstable, resulting in deteriorated initial discharge capacity. When the primary particle diameter of the lithium titanate particles is excessively large, the resulting particles may fail to exhibit a sufficient output characteristic (high-efficiency discharge capacity retention rate) as required. The primary particle diameter of the lithium titanate particles is more preferably in the range of 0.1 to 0.3 μm.

The specific surface area of the lithium titanate particles according to the Invention 1 as measured by BET method is in the range of 7 to 15 $m^2/g$. When the specific surface area of the lithium titanate particles is less than the above-specified range, the resulting particles tend to be deteriorated in output characteristic (high-efficiency discharge capacity retention rate). When the specific surface area of the lithium titanate particles is more than the above-specified range, the obtained battery tends to suffer from swelling owing to generation of gasses therein. The specific surface area of the lithium titanate particles is preferably 8 to 13 $m^2/g$.

Next, the process for producing the lithium titanate particles according to the Invention 1 is described.

That is, the lithium titanate particles according to the Invention 1 are obtained by calcining a mixture comprising at least $Li_2TiO_3$ and $TiO_2$ at a temperature of not lower than 650° C. and lower than 800° C.

The $Li_2TiO_3$ used for production of the lithium titanate particles according to the Invention 1 may have any structural defect in crystal structure thereof or oxygen deficiency/oxygen surplus as long as it is possible to identify the $Li_2TiO_3$ when indexed by JCPDS.

The $Li_2TiO_3$ used in the Invention 1 may be obtained by reacting a lithium compound and a titanium compound such as titanium oxide by a wet reaction method or by a solid state method.

The Li compound which may be used in the Invention 1 is not particularly limited, and various lithium salts may be used. Among these lithium compounds, lithium hydroxide is especially preferably used in the wet method, and lithium carbonate is especially preferably used in a dry method.

The $TiO_2$ which may be used in the Invention 1 may be either an anatase type, a rutile type or a mixed phase type. Among these compounds, preferred is $TiO_2$ of an anatase type.

Also, when subjected to mixing reaction, it is advantageous to use fine particles thereof in order to enhance the reactivity.

Also, the mixing condition of $Li_2TiO_3$ and $TiO_2$ may be any condition as long as both the components are uniformly mixed with each other, and may be any of a dry-mixed condition, a wet-coated condition and a mixed phase condition.

The mixture of $Li_2TiO_3$ and $TiO_2$ may be prepared in the wet method by controlling the temperature and time. In addition, the mixture may be prepared by previously producing $Li_2TiO_3$ and then mixing the thus produced $Li_2TiO_3$ with $TiO_2$. However, in the above case, it is required to use an elevated calcination temperature. Therefore, it is necessary to suitably control Li/Ti ratio and BET.

Meanwhile, the production conditions of the mixture of $Li_2TiO_3$ and $TiO_2$ are not particularly limited. The mixture of $Li_2TiO_3$ and $TiO_2$ may also be produced by heating a reaction suspension prepared by mixing titanium oxide and lithium hydroxide such that a molar ratio of Li to Ti (Li/Ti) is more than 1.0 and less than 1.5 in a temperature range of not lower than 80° C. and lower than 100° C., stirring and aging the suspension in the same temperature range for a period of not less than 5 hr and less than 15 hr, and then subjecting the resulting reaction suspension to filtration and drying.

The $Li_2TiO_3$ and $TiO_2$ used for production of the lithium titanate particles according to the Invention 1 are preferably prepared such that a ratio of Li to Ti (Li/Ti) in the particles obtained after the calcination lies within the range of 0.805 to 0.830. In order to control the Li/Ti ratio to the above-specified range, the mixing ratio of $Li_2TiO_3$ and $TiO_2$ may be adjusted, or the lithium compound may be further added to the mixture. The reason why the Li/Ti ratio is controlled to more than 0.80, is that $Li_2TiO_3$ is allowed to remain after the calcination. When the Li/Ti ratio is excessively larger than the above-specified range, the resulting particles tend to be deteriorated in initial discharge capacity. When the amount of remaining $Li_2TiO_3$ is further excessively large, the content of residual alkalis in the resulting lithium titanate particles tends to be increased, resulting in occurrence of gelation of a coating material.

The thus prepared mixture of $Li_2TiO_3$ and $TiO_2$ is calcined at a temperature of not lower than 650° C. and lower than 800° C. When the calcination temperature is lower than 650° C., a large amount of $TiO_2$ tends to remain in the resulting particles. When the calcination temperature is excessively high, the BET of the resulting particles tends to become excessively small owing to growth of the particles, so that the resulting particles tend to be deteriorated in output characteristic (high-efficiency discharge capacity retention rate). The calcination temperature is preferably 680 to 780° C.

The atmosphere used upon conducting the calcination may be either an oxidative atmosphere or a reducing atmosphere, and is preferably an oxidative atmosphere. The resulting lithium titanate particles may have oxygen deficiency or oxygen surplus as far as a degree of the oxygen deficiency or oxygen surplus lies within a known technical range.

The lithium titanate particles obtained after the calcination may be pulverized to control a particle size distribution thereof. The shape of a characteristic curve of the particle size distribution of the lithium titanate particles may be either sharp or broad, or bimodal.

The lithium titanate particles according to the Invention 1 may be used as negative electrode active substance particles for non-aqueous electrolyte secondary batteries.

Next, a negative electrode comprising the negative electrode active substance particles according to the Invention 1 and a non-aqueous electrolyte secondary battery are described.

When producing the negative electrode comprising the negative electrode active substance particles according to the Invention 1, a conductive agent and a binder are added to and mixed with the particles by an ordinary method. Examples of the preferred conductive agent include acetylene black, carbon black and graphite. Examples of the preferred binder include polytetrafluoroethylene and polyvinylidene fluoride.

The secondary battery produced by using the negative electrode comprising the negative electrode active substance particles according to the Invention 1 comprises a positive electrode, the above negative electrode and an electrolyte.

Examples of a positive electrode active substance which may be used for production of the positive electrode include general positive electrode materials for non-aqueous secondary batteries such as lithium cobaltate, lithium manganate and lithium nickelate.

Also, as a solvent for the electrolyte solution, there may be used combination of ethylene carbonate and diethyl carbonate, as well as an organic solvent comprising at least one compound selected from the group consisting of carbonates such as propylene carbonate and dimethyl carbonate, and ethers such as dimethoxyethane.

Further, as the electrolyte, there may be used a solution prepared by dissolving lithium phosphate hexafluoride as well as at least one lithium salt selected from the group consisting of lithium perchlorate, lithium borate tetrafluoride and the like in the above solvent.

The non-aqueous electrolyte secondary battery produced using an electrode comprising the negative electrode active substance particles according to the Invention 1 has a capacity of not less than 165 mAh/g as measured at a voltage of 1.0 V or more by the below-mentioned evaluation method, and an output characteristic (high-efficiency discharge capacity retention rate) of not less than 80% as calculated from the discharge capacity ratio 10 C/0.1 C.

As a result of a load test of the secondary battery, it is considered that $Li_2TiO_3$ remaining in a specific amount in lithium titanate as negative electrode active substance particles has a buffer action against swelling and contraction of a crystal lattice thereof. In addition, it is considered that $Li_2TiO_3$ remaining in the particles induces distortion of the crystal structure (such as point defect and plane defect) and therefore the resulting particles are enhanced in electronic conductivity and ionic conductivity. As a result, it is considered that the negative electrode active substance particles according to the Invention 1 can exhibit a high output characteristic (high-efficiency discharge capacity retention rate).

Meanwhile, the lithium titanate particles according to the Invention 1 may also be used as a positive electrode active substance.

When the lithium titanate particles according to the Invention 1 is used as a positive electrode active substance, the non-aqueous electrolyte secondary battery comprises the above electrode, counter electrode and electrolyte. As the material for the counter electrode (negative electrode), there may be used metallic lithium, lithium alloys or the like as well as carbon-based materials such as graphite and coke.

<Function>

The most important point of the Invention 1 resides in that by using the lithium titanate particles in which $Li_2TiO_3$ is present in a specific amount, it is possible to obtain a non-aqueous electrolyte secondary battery which exhibits an excellent initial discharge capacity and a high output characteristic (high-efficiency discharge capacity retention rate) as required for a secondary battery, and in which generation of gases is suppressed.

Hitherto, as described in Patent Document 5, lithium titanate particles which is reduced in amounts of impurity phases and has a high purity of $Li_4Ti_5O_{12}$ have been produced based on a peak intensity ratio thereof as measured by X-ray diffraction. However, even when merely increasing a purity of $Li_4Ti_5O_{12}$ in the particles, the resulting lithium titanate particles tend to fail to fully satisfy properties including a high initial discharge capacity, an excellent output characteristic (high-efficiency discharge capacity retention rate) and suppressed generation of gases.

The present inventors have conducted quantitative determination of impurity phases in the lithium titanate particles by Rietveld analysis which can analyze a purity thereof more accurately than the peak intensity ratio of X-ray diffraction, and further have allowed $Li_2TiO_3$ to be present in the particles in a extremely small amount, and have controlled a BET specific surface area of the particles. As a result, it is possible to obtain a negative active substance capable of exhibiting high battery characteristics.

Next, the construction of the Invention 2 is described in more detail.

The lithium titanate particles according to the Invention 2 at least have a spinel structure, and are in the form of a compound represented by the general chemical formula: $Li_4Ti_5O_{12}$. Meanwhile, in the present invention, the lithium titanate particles may also comprise the other impurity phases as far as the crystal distortion and crystallite size of the particles lie within the below-mentioned ranges. The total amount of the impurity phases is preferably not more than 6%.

By subjecting the lithium titanate particles to XRD measurement and performing a Rietveld analysis of the measurement data, it is possible to determine the crystal distortion and crystallite size of the particles. The measurement is conducted by step-scanning in the range ($2\theta/\theta$) of 10 to 90 degrees at the intervals of 0.02°.

The crystal distortion and crystallite size of the lithium titanate particles according to the Invention 2 can be calculated from XRD pattern by performing a Rietveld analysis thereof. When the crystal distortion is more than 0.0015, the resulting particles tend to be deteriorated in output characteristic (high-efficiency discharge capacity retention rate). The crystal distortion of the lithium titanate particles is preferably in the range of not more than 0.0014 and more preferably 0.0001 to 0.0013.

In addition, when the crystallite size of the lithium titanate particles is out of the range of 80 to 300 nm, the resulting particles tend to be deteriorated in output characteristic (high-efficiency discharge capacity retention rate). The crystallite size of the lithium titanate particles is preferably in the range of 90 to 290 nm and more preferably 100 to 280 nm.

In the Invention 2, it is important that as determined by Rietveld analysis of the XRD pattern of the lithium titanate particles, the crystal distortion of the particles is not more than 0.0015, and the crystallite size of the particles is in the range of 80 to 300 nm. In this regard, there are present the following two main reasons.

The first point is based on the finding that when the crystal distortion of the lithium titanate particles lies within the above range defined by the present invention, the output characteristic (high-efficiency discharge capacity retention rate) of the particles is enhanced irrespective of the BET specific surface area thereof. In general, in order to enhance the output characteristic (high-efficiency discharge capacity retention rate) of the particles, there may be used the method of increasing the BET specific surface area thereof (for example, the degree of pulverization of the particles is increased to form fine particles). However, there tends to occur damage to the particles (such as residual stress or change in chemical composition), so that any distortion tends to remain in the particles. It has been found that when the distortion is larger than the above-specified range of the present invention, the output characteristic (high-efficiency discharge capacity retention rate) of the resulting particles tends to be rapidly deteriorated.

The second point resides in that even though the crystal distortion lies within the above-specified range of the present invention, when the crystallite size is out of the range of 80 to 300 nm, the output characteristic (high-efficiency discharge capacity retention rate) of the resulting particles tends to be deteriorated. That is, when the crystallite size is less than 80 nm, an electrode coating material comprising the resulting particles tends to be deteriorated in dispersibility. When the crystallite size is more than 300 nm, diffusion of Li ions in the particles tends to be deteriorated, so that the output characteristic (high-efficiency discharge capacity retention rate) of the resulting particles also tends to be deteriorated.

It is considered that the lithium titanate particles capable of satisfying the above two points can exhibit a higher output characteristic (high-efficiency discharge capacity retention rate) and, as a result, are excellent in long-term stability.

The specific surface area of the lithium titanate particles according to the Invention 2 as measured by BET method is preferably in the range of 6 to 30 $m^2/g$. When the specific surface area of the lithium titanate particles is less than the above-specified range, the resulting particles tend to be deteriorated in output characteristic (high-efficiency discharge capacity retention rate). When the specific surface area of the lithium titanate particles is more than the above-specified range, the resulting particles tend to be deteriorated in properties as an active substance for secondary batteries. The specific surface area of the lithium titanate particles is more preferably 7 to 20 $m^2/g$.

Next, the process for producing the lithium titanate particles according to the Invention 2 is described.

The process for producing the lithium titanate particles according to the Invention 2 is not particularly limited. However, in the dry method, the primary particles tend to have a large size owing to high-temperature calcination. When such particles are pulverized to form fine particles, any distortion tends to be caused therein, so that it may be difficult to attain the specific output characteristic (high-efficiency discharge capacity retention rate) as defined by the present invention. Therefore, in the present invention, it is desirable to use a wet method requiring no strong pulverization.

For example, the lithium titanate particles according to the Invention 2 are obtained by calcining a mixture comprising at least $Li_2TiO_3$ and $TiO_2$ at a temperature of not lower than 650° C. and lower than 800° C.

The $Li_2TiO_3$ used for production of the lithium titanate particles according to the Invention 2 may have any structural defect in crystal structure thereof or oxygen deficiency/oxygen surplus as long as it is possible to identify the $Li_2TiO_3$ when indexed by JCPDS.

The Li compound which may be used in the Invention 2 is not particularly limited, and various lithium salts may be used. Among these lithium compounds, lithium hydroxide is especially preferably used in the wet method.

The $TiO_2$ which may be used in the Invention 2 may be either an anatase type, a rutile type or a mixed phase type. Among these compounds, preferred is $TiO_2$ of an anatase type.

Also, when subjected to mixing reaction, it is advantageous to use fine particles thereof in order to enhance the reactivity.

Also, the mixing condition of $Li_2TiO_3$ and $TiO_2$ may be any condition as long as both the components are uniformly mixed with each other, and may be any of a dry-mixed condition, a wet-coated condition and a mixed phase condition.

The mixture of $Li_2TiO_3$ and $TiO_2$ may be prepared in the wet method by controlling the temperature and time. In addition, the mixture may be prepared by previously producing $Li_2TiO_3$ and then mixing the thus produced $Li_2TiO_3$ with $TiO_2$. However, in the above case, it is required to use an elevated calcination temperature. Therefore, it is necessary to suitably control Li/Ti ratio and BET.

Meanwhile, the production conditions of the mixture of $Li_2TiO_3$ and $TiO_2$ are not particularly limited. The mixture of $Li_2TiO_3$ and $TiO_2$ may also be produced by heating a reaction suspension prepared by mixing titanium oxide and lithium hydroxide such that a molar ratio of Li to Ti (Li/Ti) is more than 1.0 and less than 1.5 in a temperature range of not lower than 80° C. and lower than 100° C., stirring and aging the suspension in the same temperature range for a period of not less than 5 hr and less than 15 hr, and then subjecting the resulting reaction suspension to filtration and drying.

The $Li_2TiO_3$ and $TiO_2$ used for production of the lithium titanate particles according to the Invention 2 are preferably prepared such that a ratio of Li to Ti (Li/Ti) in the particles obtained after the calcination lies within the range of 0.805 to 0.83. In order to control the Li/Ti ratio to the above-specified range, the mixing ratio of $Li_2TiO_3$ and $TiO_2$ may be adjusted, or the lithium compound may be further added to the mixture. The reason why the Li/Ti ratio is controlled to more than 0.80, is that $Li_2TiO_3$ is allowed to remain after the calcination. When the Li/Ti ratio is excessively larger than the above-specified range, the resulting particles tend to be deteriorated in initial discharge capacity. When the amount of remaining $Li_2TiO_3$ is further excessively large, the content of residual alkalis in the resulting lithium titanate particles tends to be increased, resulting in occurrence of gelation of a coating material.

The thus prepared mixture of $Li_2TiO_3$ and $TiO_2$ is calcined at a temperature of not lower than 650° C. and lower than 800° C. When the calcination temperature is lower than 650° C., a large amount of $TiO_2$ tends to remain in the resulting particles. When the calcination temperature is excessively high, the BET specific surface area of the resulting particles tends to become excessively low owing to growth of the particles, so that the resulting particles tend to be deteriorated in output characteristic (high-efficiency discharge capacity retention rate). The calcination temperature is preferably 680 to 780° C.

The atmosphere used upon conducting the calcination may be either an oxidative atmosphere or a reducing atmosphere, and is preferably an oxidative atmosphere. The resulting lithium titanate particles may have oxygen deficiency or oxygen surplus as far as a degree of the oxygen deficiency or oxygen surplus lies within a known technical range.

The lithium titanate particles according to the Invention 2 may be used as negative electrode active substance particles for non-aqueous electrolyte secondary batteries.

Next, a negative electrode comprising the lithium titanate particles according to the Invention 2 and a non-aqueous electrolyte secondary battery are described.

When producing the negative electrode comprising the lithium titanate particles according to the Invention 2, a conductive agent and a binder are added to and mixed with the lithium titanate particles by an ordinary method. Examples of the preferred conductive agent include acetylene black, carbon black and graphite. Examples of the preferred binder include polytetrafluoroethylene and polyvinylidene fluoride.

The secondary battery produced by using the negative electrode comprising the lithium titanate particles according to the Invention 2 comprises a positive electrode, the above negative electrode and an electrolyte.

Examples of a positive electrode active substance which may be used for production of the positive electrode include general positive electrode materials for non-aqueous secondary batteries such as lithium cobaltate, lithium manganate and lithium nickelate.

Also, as a solvent for the electrolyte solution, there may be used combination of ethylene carbonate and diethyl carbonate, as well as an organic solvent comprising at least one compound selected from the group consisting of carbonates such as propylene carbonate and dimethyl carbonate, and ethers such as dimethoxyethane.

Further, as the electrolyte, there may be used a solution prepared by dissolving lithium phosphate hexafluoride as well as at least one lithium salt selected from the group consisting of lithium perchlorate, lithium borate tetrafluoride and the like in the above solvent.

The non-aqueous electrolyte secondary battery produced using an electrode comprising lithium titanate particles according to the Invention 2 has a capacity of not less than 165 mAh/g as measured at a voltage of 1.0 V or more by the below-mentioned evaluation method, and an output characteristic (high-efficiency discharge capacity retention rate) of not less than 85% as calculated from a discharge capacity ratio 10 C/0.1 C.

Meanwhile, the lithium titanate particles according to the Invention 2 may also be used as a positive electrode active substance.

When the lithium titanate particles according to the Invention 2 is used as a positive electrode active substance, the resulting non-aqueous electrolyte secondary battery comprises the above electrode, counter electrode and electrolyte. As the material for the counter electrode (negative electrode), there may be used metallic lithium, lithium alloys or the like as well as carbon-based materials such as graphite and coke.

<Function>

The most important point of the Invention 2 resides in that the crystallite size of the lithium titanate particles is adjusted to the specific range as defined by the present invention while suppressing a crystal distortion thereof. If the BET specific surface area of the lithium titanate particles is increased to attain a high output characteristic (high-efficiency discharge capacity retention rate) thereof, it is not necessarily possible to obtain the particles having good properties. According to the present invention, it has been found that in order to attain a higher output characteristic (high-efficiency discharge capacity retention rate), it is important to well control the crystal distortion and crystallite size of the lithium titanate particles. In order to attain a good output characteristic (high-efficiency discharge capacity retention rate), there is generally used the method of pulverizing the active substance particles into fine particles. Although it is possible to obtain the fine particles by excessively pulverizing the active substance particles, any crystal distortion tends to remain in the particles, so that it is not finally possible to attain an excellent output characteristic (high-efficiency discharge capacity retention rate).

The present inventors have noticed not only the BET specific surface area and the crystallite size of the lithium titanate particles but also the crystal distortion thereof, and have found the method of controlling properties of the lithium titanate particles based on the crystal distortion. As a result, it becomes possible to obtain lithium titanate particles having high battery characteristics.

Next, the construction of the Invention 3 is described in more detail.

The process for producing the lithium titanate particles according to the Invention 3-1 is described below.

In the process for producing the lithium titanate particles according to the Invention 3-1, a predetermined amount of a water-soluble lithium solution is added to and mixed with a water suspension of an oxide of titanium having a BET specific surface area of 40 to 400 m$^2$/g and a primary particle diameter of 5 to 50 nm, and the resulting mixed suspension is subjected to aging reaction at a temperature of 50 to 100° C. The obtained reaction product is subjected to filtration, drying and pulverization, and the resulting dry particles are subjected to heat-calcination treatment at a temperature of 550 to 800° C. to obtain the lithium titanate particles.

Examples of the oxide of titanium include titanium oxide (anatase type) and titanium oxide (rutile type). Among these oxides of titanium, preferred is titanium oxide (anatase type). Examples of the water-soluble lithium include lithium hydroxide, lithium carbonate and lithium sulfate. Among these water-soluble lithium compounds, preferred is lithium hydroxide.

The BET specific surface area of the oxide of titanium is 40 to 400 m$^2$/g and preferably 50 to 400 m$^2$/g. When the BET specific surface area of the oxide of titanium is less than 40 m$^2$/g, the aging reaction in the water suspension tends to have a poor reactivity, so that the oxide of titanium tends to be insufficiently reacted with the water-soluble lithium solution. As a result, even when the resulting reaction product is subjected to filtration, drying and pulverization, it is not possible to obtain particles having an Li$_4$Ti$_5$O$_{12}$ type spinel structure single phase. When the BET specific surface area of the oxide of titanium is more than 400 m$^2$/g, the resulting particles tend to be difficult to handle and tend to be generally expensive as a raw material, and therefore are undesirable in view of achieving the object of the Invention 3.

The primary particle diameter of the oxide of titanium is 5 to 50 nm and preferably 5 to 45 nm. When the primary particle diameter of the oxide of titanium is less than 5 nm, the resulting particles tend to be difficult to handle and tend to be generally expensive as a raw material, and therefore are undesirable in view of achieving the object of the present invention. When the primary particle diameter of the oxide of titanium is more than 50 nm, the aging reaction in the water suspension tends to have a poor reactivity, so that the oxide of titanium tends to be insufficiently reacted with the water-soluble lithium solution. As a result, even when the resulting reaction product is subjected to filtration, drying and pulverization, it is not possible to obtain particles having an Li$_4$Ti$_5$O$_{12}$ type spinel structure single phase.

The amount of lithium added based on titanium is controlled such that an Li/Ti ratio (molar ratio) is 0.80 to 2.0 and preferably 0.85 to 1.7. When the amount of lithium added based on titanium is less than 0.80, it is not possible to obtain particles having an Li$_4$Ti$_5$O$_{12}$ type spinel structure single phase. When the amount of lithium added based on titanium is more than 2.0, the addition of lithium tends to exhibit no further effect and rather tends to cause increase in costs, and therefore the addition of such an excessive amount of lithium is meaningless.

The temperature used in the aging reaction is preferably 50 to 100° C. When the aging reaction temperature is lower than 50° C., the oxide of titanium tends to be insufficiently reacted with the water-soluble lithium solution in the aging reaction in the water suspension. As a result, even when the resulting reaction product is subjected to filtration, drying and pulverization, it is not possible to obtain particles having an Li$_4$Ti$_5$O$_{12}$ type spinel structure single phase. Even when the aging reaction temperature is higher than 100° C., substantially no further increase in effects by the use of such a high temperature tends to be attained, and rather an expensive pressure container such as an autoclave tends to be undesirably needed. The aging reaction temperature is more preferably 60 to 100° C. The reaction time upon the aging reaction is preferably 4 to 10 hr.

The dry particles obtained by subjecting the aging reaction product to filtration and drying are preferably in the form of a mixture comprising at least titanium oxide and a lithium/titanium composite oxide having a rock salt structure.

The heat-calcination treatment temperature is preferably 550 to 800° C. When the heat-calcination treatment temperature is lower than 550° C., it is not possible to obtain particles having an Li$_4$Ti$_5$O$_{12}$ type spinel structure single phase. When the heat-calcination treatment temperature is higher than 800° C., the resulting particles tend to be undesirably lowered in electrochemical properties (battery characteristics) owing to accelerated sintering between the particles. The atmosphere used in the calcination treatment is preferably air. The calcination treatment time is preferably 2 to 10 hr.

The BET specific surface area of the lithium titanate particles produced by the production process according to the Invention 3 is preferably 5.0 to 30 m$^2$/g. When the BET specific surface area of the lithium titanate particles is less than 5 m$^2$/g, the resulting particles tend to be deteriorated in high-efficiency discharge capacity retention rate. When the BET specific surface area of the lithium titanate particles is more than 30 m$^2$/g, it may be difficult to obtain particles having an Li$_4$Ti$_5$O$_{12}$ type spinel structure single phase, and the resulting particles tend to be considerably deteriorated in properties as an active substance for secondary batteries. The BET specific surface area of the lithium titanate particles is more preferably 5.0 to 25 m$^2$/g and still more preferably 5.0 to 20 m$^2$/g.

The lithium titanate particles produced by the production process according to the Invention 3 have a crystal structure comprising a spinel type single phase. When any impurity phase is present in the crystal structure, the resulting particles tend to be undesirably lowered in initial discharge capacity.

Next, the non-aqueous electrolyte secondary battery according to the Invention 3 is described.

The non-aqueous electrolyte secondary battery as described in the present invention is characterized by using the lithium titanate particles obtained by the production process according to the Invention 3-1 as an electrode active substance. The electrode for the secondary battery may be produced by adding a conductive agent such as carbon black and a binder such as a fluororesin to the lithium titanate particles and molding or applying the resulting mixture in an appropriate manner.

The non-aqueous electrolyte secondary battery comprises the above electrode, counter electrode and electrolyte. When using the lithium titanate particles as the positive electrode active substance, as the material of the counter electrode (negative electrode), there may be used metallic lithium, lithium alloys, or carbon-based materials such as graphite and coke. When using the lithium titanate particles as the negative electrode active substance, as the material of the counter electrode (positive electrode), there may be used one or more compounds selected from the group consisting of lithium-containing manganese oxide, lithium manganate, lithium cobaltate, lithium nickelate, lithium iron phosphate, vanadium pentaoxide, and compounds obtained by replacing a part of elements in these compounds with the other elements. The electrolyte solution used in the secondary battery may be prepared by dissolving a lithium salt such as $LiPF_6$, $LiClO_4$, $LiCF_3SO_3$, $LiN(CF_3SO_2)_2$ and $LiBF_4$ in a solvent such as propylene carbonate, ethylene carbonate, diethyl carbonate and 1,2-dimethoxyethane.

<Function>

The most important point of the Invention 3 resides in that by using the lithium titanate particles obtained by the production process according to the Invention 3, it is possible to obtain a non-aqueous electrolyte secondary battery capable of exhibiting an excellent initial discharge capacity and a high output characteristic (high-efficiency discharge capacity retention rate) as required for a secondary battery.

The reason why the excellent initial discharge capacity can be attained by the Invention 3 is that the lithium titanate particles obtained by the production process according to the Invention 3 have a crystal structure comprising an $Li_4Ti_5O_{12}$ type spinel structure single phase.

Also, the dry particles obtained by subjecting the mixed suspension prepared by adding a predetermined amount of the water-soluble lithium solution to the water suspension of an oxide of titanium to aging reaction at a temperature of 50 to 100° C. and then subjecting the thus aged particles to filtration and drying are in the form of a mixture comprising at least titanium oxide and a lithium/titanium composite oxide with a rock salt structure. That is, at the stage of the dry particles before the calcination, a part of titanium oxide is reacted with lithium to form the lithium/titanium composite oxide with a rock salt type structure, so that by carrying out the calcination at a relatively low temperature, it is possible to obtain fine particles having a spinel type structure single phase. Further, in the above aging reaction conducted at a temperature of not higher than 100° C., the Li/Ti charge ratio is set to a low value (an amount of Li exceeding 0.80 in a stoichiometric composition of $Li_4Ti_5O_{12}$ is small) so that segregation of Li upon the filtration and drying of the aging reaction product can be suppressed. As a result, by calcining the resulting dry particles at a temperature of 550 to 800° C., it is possible to obtain $Li_4Ti_5O_{12}$ fine particles having a uniform composition.

More specifically, it is suggested by the present inventors that owing to the above effect of producing the $Li_4Ti_5O_{12}$ fine particles having a spinel type structure single phase and a uniform composition, it is possible to obtain lithium titanate particles having an excellent initial discharge capacity as an active substance for non-aqueous electrolyte secondary batteries and a high output characteristic (high-efficiency discharge capacity retention rate).

In addition, in the production process according to the Invention 3, a predetermined amount of the water-soluble lithium solution is added to and mixed with the water suspension of the oxide of titanium, and the resulting mixed suspension is subjected to aging reaction. At this time, since the aging reaction temperature is adjusted to not higher than 100° C., no expensive pressure container such as an autoclave is need for the aging reaction. Further, when taking into account various steps up to the above filtration, drying and pulverization, the production process of the Invention 3 is regarded as being an inexpensive and simple process.

Next, the construction of the Invention 4 is described in more detail.

First, the Mg-containing lithium titanate particles according to the Invention 4-1 are described.

The Mg-containing lithium titanate particles according to the Invention 4-1 have a composition represented by the formula:

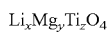

wherein x, z>0; 0.01≤y≤0.20; 0.01≤y/z≤0.10; and 0.5≤(x+y)/z≤1.0.

When the Mg content y in the Mg-containing lithium titanate particles according to the Invention 4-1 is less than 0.01, the resulting particles tend to be insufficient in the effect of enhancing an output characteristic (high-efficiency discharge capacity retention rate) thereof owing to the Mg substitution. When the Mg content y in the Mg-containing lithium titanate particles according to the Invention 4-1 is more than 0.20, it may be difficult to obtain particles having a spinel type single phase, and the resulting particles tend to be deteriorated in initial discharge capacity. The Mg content y in the Mg-containing lithium titanate particles according to the Invention 4-1 is preferably 0.02≤y≤0.15 and more preferably 0.05≤y≤0.15.

When the compositional ratios y/z and (x+y)/z of the Mg-containing lithium titanate particles according to the Invention 4-1 are out of the above-specified ranges, it may be difficult to obtain particles having a spinel type single phase, and the resulting particles tend to be deteriorated in both initial discharge capacity and output characteristic (high-efficiency discharge capacity retention rate).

The BET specific surface area of the Mg-containing lithium titanate particles according to the Invention 4-1 is 5.0 to 50 m²/g. When the BET specific surface area of the Mg-containing lithium titanate particles is less than 5 m²/g, the resulting particles tend to be deteriorated in output characteristic (high-efficiency discharge capacity retention rate). When the BET specific surface area of the Mg-containing lithium titanate particles is more than 50 m²/g, the resulting particles tend to hardly exhibit an excellent dispersibility as an active substance for secondary batteries. The BET specific surface area of the Mg-containing lithium titanate particles is preferably 5.0 to 45 m²/g and more preferably 5.0 to 40 m²/g.

The Mg-containing lithium titanate particles according to the Invention 4-1 have a crystal structure comprising an $Li_4Ti_5O_{12}$ type spinel structure single phase. When any impurity phase is present in the crystal structure, the resulting particles tend to be undesirably lowered in both initial discharge capacity and output characteristic (high-efficiency discharge capacity retention rate).

The lattice constant (a) of the spinel type structure of the Mg-containing lithium titanate particles according to the Invention 4-1 is required to satisfy the formula:

$$0.050y+8.3595 < a \leq 0.080y+8.3595 \text{ (Å)}$$

as a relational formula relative to the Mg content y in the above compositional formula. When the lattice constant (a) is less than the above-specified range, the Mg distribution in the spinel type structure tends to be non-uniform, so that the resulting particles may fail to exhibit a sufficient effect of enhancing an output characteristic (high-efficiency discharge capacity retention rate) of the resulting secondary battery. In addition, in this case, since no spinel type single phase is present in the crystal structure, the resulting particles tend to be deteriorated in electrochemical properties.

Next, the process for producing the Mg-containing lithium titanate particles according to the Invention 4-1 is described.

The Mg-containing lithium titanate particles according to the Invention 4-1 may be produced by adding a predetermined amount of a water-soluble lithium solution and a predetermined amount of a water-soluble Mg salt solution or $Mg(OH)_2$ particles to a water suspension of an oxide of titanium under mixing, subjecting the resulting mixed suspension to aging reaction at a temperature of not higher than 100° C., subjecting the resulting reaction product to filtration, drying and pulverization, and then subjecting the resulting dry particles to heat-calcination treatment.

Examples of the oxide of titanium include titanium oxide (anatase type) and titanium oxide (rutile type). Among these oxides of titanium, preferred is titanium oxide (anatase type). Examples of the water-soluble lithium include lithium hydroxide, lithium carbonate and lithium sulfate. Among these water-soluble lithium compounds, preferred is lithium hydroxide. Examples of the water-soluble Mg salt include magnesium sulfate, magnesium chloride and magnesium nitrate. Among these water-soluble Mg salts, preferred are magnesium sulfate and magnesium chloride.

The amount of lithium added based on titanium is controlled such that the Li/Ti ratio (molar ratio) is 0.80 to 2.0 and preferably 0.8 to 1.8.

The amount of magnesium added based on titanium is 0.6 to 10.0 mol %, preferably 1.0 to 9.0 mol % and more preferably 2.0 to 9.0 mol %.

The temperature used in the aging reaction is preferably 60 to 100° C. and more preferably 70 to 100° C. The reaction time upon the aging reaction is preferably 4 to 10 hr.

The dry particles obtained by subjecting the aging reaction product to filtration and drying are preferably in the form of a mixture comprising at least titanium oxide and a lithium/titanium composite oxide having a rock salt structure.

The heat-calcination treatment temperature is preferably 500 to 800° C. When the heat-calcination treatment temperature is lower than 500° C., it is not possible to obtain particles having an $Li_4Ti_5O_{12}$ type spinel structure single phase. When the heat-calcination treatment temperature is higher than 800° C., the resulting particles tend to be undesirably lowered in electrochemical properties (battery characteristics) owing to accelerated sintering between the particles. The atmosphere used in the calcination treatment is preferably air. The calcination treatment time is preferably 2 to 10 hr.

Next, the Mg-containing lithium titanate particles according to the Invention 4-3 are described.

The Mg-containing lithium titanate particles according to the Invention 4-3 are those particles obtained by allowing carbon to be present on a surface of the respective Mg-containing lithium titanate particles according to the Invention 4-1.

The composition and specific surface area of the Mg-containing lithium titanate particles on the surface of which carbon is allowed to be present according to the Invention 4-3 are substantially the same as those of the Mg-containing lithium titanate particles according to the Invention 4-1.

The Mg-containing lithium titanate particles on the surface of which carbon is allowed to be present according to the Invention 4-3 have a crystal structure comprising a spinel type single phase.

The content of carbon in the Mg-containing lithium titanate particles on the surface of which carbon is allowed to be present according to the Invention 4-3 is preferably 1.5 to 5.0%.

In the Mg-containing lithium titanate particles on the surface of which carbon is allowed to be present according to the Invention 4-3, as the carbon species used upon treating the surface of the respective particles therewith, there are preferably used carbon blacks such as acetylene black and ketjen black.

In the Mg-containing lithium titanate particles on the surface of which carbon is allowed to be present according to the Invention 4-3, as the method of treating the surface of the respective particle with carbon, there may be used the method of mixing the dry particles before the calcination as described in the Invention 4-2 with the above carbon species and then calcining the resulting mixture in an inert gas atmosphere such as nitrogen and argon, or the method of adding a water dispersion of the above carbon species to a filter cake of the reaction product before the calcination as described in the Invention 4-2, followed by kneading these components, and then calcining the resulting dry particles in an inert gas atmosphere such as nitrogen and argon.

Next, the non-aqueous electrolyte secondary battery according to the Invention 4-4 is described.

The non-aqueous electrolyte secondary battery according to the present invention is characterized by using the Mg-containing lithium titanate particles according to the Invention 4-1 or 4-3 as an electrode active substance. The electrode for the secondary battery may be produced by adding a conductive agent such as carbon black and a binder such as a fluororesin to the Mg-containing lithium titanate particles and molding or applying the resulting mixture in an appropriate manner.

The non-aqueous electrolyte secondary battery comprises the above electrode, counter electrode and electrolyte. When using the Mg-containing lithium titanate particles as the positive electrode active substance, as the material of the counter electrode (negative electrode), there may be used metallic lithium, lithium alloys, or carbon-based materials such as graphite and coke. When using the Mg-containing lithium titanate particles as the negative electrode active substance, as the material of the counter electrode (positive electrode), there may be used one or more compounds selected from the group consisting of lithium-containing manganese oxide, lithium manganate, lithium cobaltate, lithium nickelate, lithium iron phosphate, vanadium pentaoxide, and compounds obtained by replacing a part of elements in these compounds with the other elements. The electrolyte solution used in the secondary battery may be prepared by dissolving a lithium salt such as $LiPF_6$, $LiClO_4$, $LiCF_3SO_3$, $LiN(CF_3SO_2)_2$ and $LiBF_4$ in a solvent such as propylene carbonate, ethylene carbonate, diethyl carbonate and 1,2-dimethoxyethane.

<Function>

The most important point of the Invention 4 resides in that by using the Mg-containing lithium titanate particles according to the present invention, it is possible to obtain a non-aqueous electrolyte secondary battery capable of exhibiting an excellent initial discharge capacity and a high output characteristic (high-efficiency discharge capacity retention rate) as required for a secondary battery.

The reason why the excellent initial discharge capacity can be well maintained by the Invention 4 is that magnesium is incorporated into the particles in such a range that it has no adverse influence on the initial discharge capacity inherent to $Li_4Ti_5O_{12}$, and the Mg-containing lithium titanate particles have a crystal structure comprising a spinel type single phase.

Further, it is suggested by the present inventors that the above advantages of the Mg-containing lithium titanate particles according to the Invention 4 can be attained owing to such an effect that magnesium is uniformly substituted for the elements located on given sites of the spinel type structure.

EXAMPLES

The present invention is described in more detail below by the following Examples. However, these Examples are only illustrative and not intended to limit the invention thereto. In the following Examples and Comparative Examples, Examples 1-1 to 1-6 and Comparative Examples 1-1 to 1-7 are intended to explain the Invention 1; Examples 2-1 to 2-4 and Comparative Examples 2-1 to 2-3 are intended to explain the Invention 2; Examples 3-1 to 3-5 and Comparative Examples 3-1 to 3-4 are intended to explain the Invention 3; and Examples 4-1 to 4-6 and Comparative Examples 4-1 to 4-4 are intended to explain the Invention 4. Meanwhile, the respective Comparative Examples correspond to only the single invention among the four Inventions (for example, Comparative Examples 1-1 to 1-7 are used only for the comparison with the Invention 1), and are not intended to serve for comparison with the other inventions.

The evaluation methods used in the present invention are as follows.

The Mg-containing lithium titanate particles and the lithium titanate particles were identified using a powder X-ray diffractometer ("RINT2500" manufactured by RIGAKU Co., Ltd.; tube: Cu; tube voltage: 40 kV; tube current: 300 mA). Also, the lattice constant of a spinel type structure of these particles was calculated from respective diffraction peaks obtained by the above powder X-ray diffraction analysis.

The elemental analysis of the Mg-containing lithium titanate particles was carried out using a plasma emission spectroscopic device ("SPS 4000" manufactured by Seiko Denshi Kogyo Co., Ltd.).

The average primary particle diameter of the particles was determined as an average value of particle diameters read out on an SEM image observed using a scanning electron microscope "SEM-EDX" equipped with an energy disperse type X-ray analyzer (manufactured by Hitachi High-Technologies Corp.).

The BET specific surface area of the particles was determined as follows. That is, a sample was dried and deaerated at 120° C. under a nitrogen gas atmosphere for 45 min, and then the BET specific surface area thereof was measured using "Macsorb HM Model No. 1208" manufactured by Mountech Co., Ltd.

The composition of the particles and the contents of impurities therein were determined as follows. That is, a formulated solution was prepared and subjected to ICP measurement to conduct quantitative determination of the respective elements therein using "iCAP6500" manufactured by Thermo Fisher Scientific K.K.

The X-ray diffraction analysis of a sample was carried out using "RAD-IIA" manufactured by Rigaku Corp. The quantitative determination of $TiO_2$ and $Li_2TiO_3$ was carried out using X-ray diffraction data thereof by performing a Rietveld analysis of the data. The Rietveld analysis was performed using "RIETAN2000".

Meanwhile, the X-ray diffraction measurement of the lithium titanate particles according to the Invention 2 was carried out using "SmartLab" manufactured by Rigaku Corp. Also, the crystal distortion and crystallite size of the particles were calculated from the X-ray diffraction data thereof by performing a Rietveld analysis of the data. The Rietveld analysis was performed using "RIETAN2000".

The battery characteristics of the Mg-containing lithium titanate particles and the battery characteristics of the lithium titanate particles (Examples 3-1 to 3-5 and Comparative Examples 3-1 to 3-4, and Examples 4-1 to 4-6 and Comparative Examples 4-1 to 4-4) were determined as follows. That is, the positive electrode, negative electrode and electrolyte solution were produced by the following methods, and a coin cell was produced therefrom to evaluate the battery characteristics thereof.

<Production of Positive Electrode>

The Mg-containing lithium titanate particles or the lithium titanate particles, acetylene black as a conductive agent and polyvinylidene fluoride as a binder were accurately weighed such that a weight ratio therebetween was 90:5:5, and fully mixed with each other in a mortar. Then, the resulting mixture was dispersed in N-methyl-2-pyrrolidone to prepare a positive electrode preparation slurry. Next, the thus prepared slurry was applied on an aluminum foil as a current collector to form a coating layer having a thickness of 40 μm, and dried in vacuum at 110° C. The thus obtained coated foil was blanked into a disk shape having a diameter of 16 mmϕ to produce a positive electrode plate.

<Production of Negative Electrode>

A metallic lithium foil was blanked into a disk shape having a diameter of 16 mmϕ to produce a negative electrode.

<Preparation of Electrolyte Solution>

A mixed solution was prepared by mixing ethylene carbonate and diethyl carbonate with each other at a volume ratio of 50:50, and 1 mol/L of lithium phosphate hexafluoride ($LiPF_6$) as an electrolyte was mixed in the resulting mixed solution to prepare an electrolyte solution.

<Assembly of Coin Cell>

In a glove box placed in an argon atmosphere, the above positive electrode and negative electrode were arranged through a polypropylene separator in a SUS316 casing, and the electrolyte solution was filled in the casing to produce a coil cell of CR2032 type.

<Evaluation of Battery>

The coin cell thus produced was subjected to charge/discharge test for secondary batteries. The measuring conditions were as follows. That is, under the condition that the current density to the positive electrode was set to 0.2 mA/cm², the coin cell was repeatedly subjected to charging and discharging cycles at a cut-off voltage between 1.0 V and 3.0 V. As the initial discharge capacity, there was used the value measured at a rate of 0.1 C. Also, the output characteristic (high-efficiency discharge capacity retention rate) was expressed by a ratio (percentage) of the discharge capacity value at a rate of 5 C to the initial discharge capacity value.

The negative electrode active substance particles according to the Invention 1 (Examples 1-1 to 1-6 and Comparative Examples 1-1 to 1-7) and the Invention 2 (Examples 2-1 to 2-4 and Comparative Examples 2-1 to 2-3) were evaluated for their battery characteristics using the coin cell of 2032 type.

In the coin cell used for evaluation of the battery characteristics, the lithium titanate according to the present invention was used in a positive electrode. More specifically, 90% by weight of the active substance, 2.5% by weight of acetylene black and 2.5% by weight of graphite as conductive agents, and 5% by weight of a solution prepared by dissolving polyvinylidene fluoride in N-methyl pyrrolidone as a binder were mixed with each other, and the resulting mixture was applied onto an Al foil and dried at 120° C. The obtained sheet was blanked into 16 mmϕ and then rolled at 3.0 t/cm² to produce a positive electrode. A 500 μm-thick metallic lithium sheet blanked into 16 mmϕ was used as a counter electrode, and a mixed solution prepared by mixing EC and DMC with each other at a volume ratio of 1:2 in which 1 mol/L of $LiPF_6$ was further dissolved was used as an electrolyte solution, thereby producing the coin cell of 2032 type.

The charge/discharge characteristic of the coin cell was determined as follows. That is, under the environmental condition within a constant-temperature vessel maintained at 25° C. and on the assumption that the charge direction was the direction in which Li is released, the coin cell was subjected to discharging until reaching 1.0 V at a current density of 0.1 C (CC-CC operation), and then the coin cell was subjected to charging until reaching 3.0 V at a current density of 0.1 C (CC-CC operation). The 1st cycle discharge capacity of this operation was measured.

The output characteristic (high-efficiency discharge capacity retention rate) was determined as follows. That is, under the environmental condition within a constant-temperature vessel maintained at 25° C., the coin cell was subjected to discharging until reaching 1.0 V at a current density of 0.1 C (CC-CC operation), and then the coin cell was subjected to charging until reaching 3.0 V at a current density of 0.1 C (CC-CC operation). The discharge capacity obtained in this operation was expressed by (a). Next, the coin cell was subjected to discharging until reaching 1.0 V at a current density of 10 C (CC-CC operation), and then the coin cell was subjected to charging until reaching 3.0 V at a current density of 0.1 C (CC-CC operation). The discharge capacity obtained in this operation was expressed by (b). The output characteristic was determined as the value calculated from the formula: (b/a×100(%)).

The amount of gases generated in the Invention 1 (Examples 1-1 to 1-6 and Comparative Examples 1-1 to 1-7) was evaluated using a laminate cell produced by the following method.

That is, 90% by weight of the lithium titanate according to the present invention, 2.5% by weight of acetylene black and 2.5% by weight of graphite as conductive agents, and 5% by weight of a solution prepared by dissolving polyvinylidene fluoride in N-methylpyrrolidone as a binder were mixed with each other, and then the resulting mixture was applied onto an Al metal foil and dried at 120° C. The obtained sheet was cut into a size of 40 mm×100 mm and then pressed at 3.0 t/cm² to produce a negative electrode.

The counter electrode was produced as follows. That is, 92% by weight of $LiMn_2O_4$, 2.5% by weight of acetylene black and 2.5% by weight of graphite as conductive agents, and 3% by weight of a solution prepared by dissolving polyvinylidene fluoride in N-methylpyrrolidone as a binder were mixed with each other, and then the resulting mixture was applied onto an Al metal foil and dried at 120° C. The obtained sheet was cut into a size of 40 mm×100 mm and then pressed at 3.0 t/cm² to produce the counter electrode.

Two sets of these electrodes were combined so as to be opposed to each other, thereby producing a laminate cell.

The thus produced laminate cell was first subjected to initial charge/discharge cycle at room temperature, and then charged until reaching 2.7 V to measure a volume of the laminate cell at the voltage. Next, the laminate cell after the above measurement was stored under the environment of 85° C. for 24 hr and then the volume of the laminate cell was measured again to evaluate an amount of gases generated from the change in volume of the laminate cell between before and after the high-temperature storage of the cell.

Typical Examples of the Invention 1 are as follows.

Example 1-1

<Production of Lithium Titanate Particles>

Titanium oxide having a specific surface area of 10 m²/g and a primary particle diameter of 180 nm and lithium hydroxide were mixed with each other such that a molar ratio of Li/Ti was 1.4 to prepare a reaction suspension, and the resulting reaction suspension was heated to 85° C. and stirred at that temperature for 12 hr. Thereafter, the reaction suspension was filtered, and the resulting filter cake was dried at 120° C. As a result of subjecting the thus obtained dry particles to X-ray diffraction analysis, it was confirmed that the particles were in the form of a mixture comprising at least $Li_2TiO_3$ and $TiO_2$.

The dry particles were placed in an alumina crucible and calcined in a muffle furnace at a temperature of 760° C. for 4 hr in an atmospheric air to obtain lithium titanate particles.

Examples 1-2 to 1-5 and Comparative Examples 1-1 to 1-5

The same procedure as in Example 1-1 was conducted except that the kind of titanium oxide, Li/Ti molar ratio, reaction temperature, reaction time and calcination temperature were changed variously, thereby obtaining lithium titanate particles.

Example 1-6

Titanium oxide having a specific surface area of 10 m²/g and a primary particle diameter of 180 nm and lithium hydroxide were mixed with each other such that a molar ratio of Li/Ti was 2.5 to prepare a reaction suspension, and the resulting reaction suspension was charged into an autoclave, heated therein to 175° C. and stirred at that temperature for 8 hr. Thereafter, the reaction suspension was filtered, and the resulting filter cake was dried at 120° C.

As a result of subjecting the thus obtained dry particles to X-ray diffraction analysis, it was confirmed that the particles had an $Li_2TiO_3$ single phase.

The thus obtained $Li_2TiO_3$ particles were mixed with titanium oxide having a specific surface area of 344 m²/g and a primary particle diameter of 5 nm such that a molar ratio of Li/Ti was 0.84 to prepare mixed particles. The resulting mixed particles were placed in an alumina crucible and calcined in a muffle furnace at a temperature of 780° C. for 4 hr in an atmospheric air to obtain lithium titanate particles.

Comparative Example 1-6

Titanium oxide having a specific surface area of 10 m²/g and a primary particle diameter of 180 nm was mixed with lithium carbonate such that a molar ratio of Li/Ti was 0.90 to prepare mixed particles. The resulting mixed particles were placed in an alumina crucible and calcined in a muffle furnace at a temperature of 850° C. for 4 hr in an atmospheric air to obtain lithium titanate particles.

Comparative Example 1-7

Titanium oxide having a specific surface area of 299 m²/g and a primary particle diameter of 5 nm was mixed with lithium hydroxide such that a molar ratio of Li/Ti was 0.9 to prepare a suspension, and the resulting suspension was stirred at an ordinary temperature for 2 hr. Thereafter, the mixed suspension was subjected to evaporation to dryness at 120° C. The resulting dry particles were placed in an alumina crucible and calcined in a muffle furnace at a temperature of 650° C. for 4 hr and then at a temperature of 800° C. for 4 hr in an atmospheric air to obtain lithium titanate particles.

Various properties of the lithium titanates obtained in the above respective Examples and Comparative Examples and production conditions thereof are shown in Tables 1 and 2.

TABLE 1

| Examples and Comp. Examples | $TiO_2$ BET specific surface area (m²/g) | Mixing ratio Li/Ti | Reaction temperature |
|---|---|---|---|
| Example 1-1 | 10 | 1.4 | 85 |
| Example 1-2 | 80 | 1.2 | 90 |
| Example 1-3 | 299 | 1.2 | 95 |
| Example 1-4 | 344 | 1.1 | 80 |
| Example 1-5 | 344 | 1.2 | 90 |
| Example 1-6 | 10 | (2.5) | 175 |
| Comp. Example 1-1 | 10 | 0.9 | 85 |
| Comp. Example 1-2 | 80 | 1.6 | 90 |
| Comp. Example 1-3 | 299 | 0.8 | 95 |
| Comp. Example 1-4 | 299 | 1 | 95 |
| Comp. Example 1-5 | 344 | 1.1 | 80 |
| Comp. Example 1-6 | 10 | 0.9 | — |
| Comp. Example 1-7 | 299 | 0.9 | Ordinary temperature |

| Examples and Comp. Examples | Reaction time | Calcination temperature (° C.) |
|---|---|---|
| Example 1-1 | 12 | 750 |
| Example 1-2 | 8 | 740 |
| Example 1-3 | 6 | 700 |
| Example 1-4 | 10 | 680 |
| Example 1-5 | 6 | 720 |
| Example 1-6 | 8 | 780 |
| Comp. Example 1-1 | 12 | 760 |
| Comp. Example 1-2 | 8 | 740 |
| Comp. Example 1-3 | 2 | 700 |
| Comp. Example 1-4 | 6 | 700 |
| Comp. Example 1-5 | 10 | 800 |
| Comp. Example 1-6 | — | 850 |
| Comp. Example 1-7 | 2 | 650 → 800 |

TABLE 2

| Examples and Comp. Examples | Analyzed value Li/Ti | Content of $Li_4Ti_5O_{12}$ (%) | Content of $TiO_2$ (%) |
|---|---|---|---|
| Example 1-1 | 0.824 | 96.3 | 0.4 |
| Example 1-2 | 0.813 | 97.5 | 0.1 |
| Example 1-3 | 0.810 | 97.8 | 0.0 |
| Example 1-4 | 0.818 | 97.1 | 0.1 |
| Example 1-5 | 0.828 | 94.9 | 0.0 |
| Example 1-6 | 0.805 | 98.2 | 0.0 |
| Comp. Example 1-1 | 0.753 | 83.9 | 15.1 |
| Comp. Example 1-2 | 0.863 | 89.8 | 0.0 |
| Comp. Example 1-3 | 0.60 | 76.5 | 21.6 |
| Comp. Example 1-4 | 0.795 | 99.2 | 0.0 |
| Comp. Example 1-5 | 0.801 | 98.8 | 0.0 |
| Comp. Example 1-6 | 0.791 | 98.0 | 1.4 |
| Comp. Example 1-7 | 0.811 | 97.7 | 0.0 |

| Examples and Comp. Examples | Content of $Li_2TiO_3$ (%) | Average primary particle diameter (μm) | BET specific surface area (m²/g) |
|---|---|---|---|
| Example 1-1 | 3.3 | 0.18 | 8.5 |
| Example 1-2 | 2.4 | 0.23 | 10.3 |
| Example 1-3 | 2.2 | 0.22 | 12.4 |
| Example 1-4 | 2.8 | 0.18 | 13.6 |
| Example 1-5 | 5.1 | 0.16 | 9.2 |
| Example 1-6 | 1.8 | 0.35 | 7.5 |
| Comp. Example 1-1 | 1.0 | 0.24 | 7.9 |
| Comp. Example 1-2 | 10.2 | 0.17 | 8.0 |
| Comp. Example 1-3 | 1.9 | 0.15 | 18.9 |
| Comp. Example 1-4 | 0.8 | 0.23 | 12.5 |
| Comp. Example 1-5 | 1.2 | 0.45 | 6.1 |
| Comp. Example 1-6 | 0.6 | 1.20 | 2.9 |
| Comp. Example 1-7 | 2.3 | 0.70 | 4.0 |

| Examples and Comp. Examples | Battery characteristics | | | | | |
|---|---|---|---|---|---|---|
| | Initial discharge capacity (mAh/g) | | 10 C/0.1 C rate retention rate (%) | | 85° C. Gassing (cc/g) | |
| Example 1-1 | 166 | B | 89 | A | 2.7 | B |
| Example 1-2 | 171 | A | 88 | A | 3.4 | B |
| Example 1-3 | 170 | A | 87 | A | 3.5 | B |
| Example 1-4 | 167 | B | 84 | B | 3.6 | B |
| Example 1-5 | 166 | B | 82 | B | 2.5 | A |
| Example 1-6 | 168 | B | 81 | B | 2.9 | B |
| Comp. Example 1-1 | 174 | B | 33 | C | 2.9 | B |
| Comp. Example 1-2 | 157 | C | 74 | C | 1.1 | A |
| Comp. Example 1-3 | 172 | A | 4 | C | 4.9 | C |
| Comp. Example 1-4 | 170 | A | 85 | A | 4.5 | C |
| Comp. Example 1-5 | 165 | B | 75 | C | 3.0 | B |
| Comp. Example 1-6 | 165 | B | 65 | C | 2.3 | A |
| Comp. Example 1-7 | 171 | A | 70 | C | 2.2 | A |

As shown in the above Examples, the lithium titanate particles according to the present invention are capable of exhibiting both a high initial discharge capacity and a high output characteristic (high-efficiency discharge capacity retention rate), i.e., not less than 165 mAh/g and not less than 80%, respectively, and further the amount of gases generated therefrom is suppressed to less than 4.0 cc/g. Therefore, the lithium titanate particles according to the present invention are suitable as an active substance for non-aqueous electrolyte secondary batteries.

Meanwhile, in the above Examples, the lithium titanate particles according to the present invention were used as a positive electrode active substance. However, even in the case where the lithium titanate particles according to the present invention are used as a negative electrode active substance, they can also exhibit excellent characteristics as an active substance for non-aqueous electrolyte secondary batteries.

Typical Examples of the Invention 2 are as follows.

<Production of Lithium Titanate Particles>

Example 2-1

Titanium oxide having a BET of 60 m²/g was mixed with lithium hydroxide such that a mixing ratio of Li/Ti was 1.2, and the resulting mixture was subjected to wet reaction at a temperature of 90° C. for 10 hr. The obtained reaction mixture was filtered, and the resulting filter cake was dried and then calcined at 760° C., and further pulverized to obtain lithium titanate particles.

Example 2-2

The lithium titanate obtained in Example 2-1 was further pulverized for 1.5 hr using a ball mill, thereby obtaining lithium titanate particles.

Comparative Example 2-1

The lithium titanate obtained in Example 2-1 was further pulverized for 3 hr using a ball mill, thereby obtaining lithium titanate particles.

Example 2-3

The lithium titanate particles obtained in Comparative Example 2-1 was calcined again at 650° C., thereby obtaining lithium titanate particles.

Example 2-4

Titanium oxide having a BET of 300 m$^2$/g was mixed with lithium hydroxide such that a mixing ratio of Li/Ti was 1.2, and the resulting mixture was subjected to wet reaction at a temperature of 90° C. for 10 hr. The obtained reaction mixture was filtered, and the resulting filter cake was dried and then calcined at 700° C., and further pulverized for 2 hr using a ball mill to obtain lithium titanate particles.

Comparative Example 2-2

The same procedure as in Example 2-4 was conducted except that the pulverization treatment using a ball mill was carried out for 4 hr, thereby obtaining lithium titanate particles.

Comparative Example 2-3

Titanium oxide having a BET of 300 m$^2$/g was dry-mixed with lithium hydroxide such that a mixing ratio of Li/Ti was 0.83, and the resulting dry mixture was calcined at 790° C. and then pulverized for 10 hr using a ball mill to obtain lithium titanate particles.

Various properties of the thus obtained lithium titanate particles are shown in Table 3.

TABLE 3

| Examples and Comp. Examples | Crystal distortion | Crystallite size (nm) | BET specific surface area (m$^2$/g) |
| --- | --- | --- | --- |
| Example 2-1 | 0.0007 | 254 | 7.8 |
| Example 2-2 | 0.0010 | 104 | 15.8 |
| Example 2-3 | 0.0010 | 131 | 13.7 |
| Example 2-4 | 0.0013 | 89 | 17.6 |
| Comp. Example 2-1 | 0.0019 | 67 | 19.7 |
| Comp. Example 2-2 | 0.0024 | 71 | 18.1 |
| Comp. Example 2-3 | 0.0032 | 386 | 5.6 |

| | Battery characteristics | |
| --- | --- | --- |
| Examples and Comp. Examples | Initial discharge capacity (mAh/g) | 10 C/0.1 C rate retention rate (%) |
| Example 2-1 | 172 | 86.0 |
| Example 2-2 | 172 | 90.0 |
| Example 2-3 | 171 | 88.7 |
| Example 2-4 | 173 | 87.5 |
| Comp. Example 2-1 | 172 | 73.0 |
| Comp. Example 2-2 | 168 | 65.9 |
| Comp. Example 2-3 | 163 | 59.3 |

As shown in the above Examples, the lithium titanate particles according to the present invention are capable of exhibiting both a high initial discharge capacity and a high output characteristic (high-efficiency discharge capacity retention rate), i.e., not less than 165 mAh/g and not less than 85%, respectively. Therefore, the lithium titanate particles according to the present invention are suitable as an active substance for non-aqueous electrolyte secondary batteries.

Meanwhile, in the above Examples, the lithium titanate particles according to the present invention were used as a positive electrode active substance. However, even in the case where the lithium titanate particles according to the present invention are used as a negative electrode active substance, they can also exhibit excellent characteristics as an active substance for non-aqueous electrolyte secondary batteries.

Typical Examples of the Invention 3 are as follows.

Example 3-1

<Production of Lithium Titanate Particles>

A suspension prepared by dispersing 72.77 g of titanium oxide (anatase type) having a specific surface area of 300 m$^2$/g and a primary particle diameter of 6 nm in 500 mL of ion-exchanged water was charged into a 1500 mL-capacity stainless steel container and gently stirred. Then, an aqueous solution prepared by dissolving 41.08 g of lithium hydroxide in 200 mL of ion-exchanged water was added to the above suspension to control a whole amount of the resulting reaction suspension to 800 mL. At this time, the Li/Ti ratio (mol/mol) in the suspension was 1.075. The resulting mixed suspension was rapidly heated to 95° C. and subjected to aging reaction at that temperature for 6 hr. After completion of the aging reaction, the obtained reaction suspension was cooled to room temperature and filtered using a nutsche, and then the resulting filter cake was dried at 120° C. and pulverized. As a result of subjecting the thus obtained dry particles to X-ray diffraction analysis, it was confirmed that the particles were in the form of a mixture comprising at least titanium oxide (oxide having an anatase type structure) and a lithium/titanium composite oxide having a rock salt type structure. The dry particles were placed in an alumina crucible and calcined in a muffle furnace at a temperature of 670° C. for 3 hr in an atmospheric air to obtain lithium titanate particles.

As a result of subjecting the thus obtained lithium titanate particles to X-ray diffraction analysis, it was confirmed that the particles had an Li$_4$Ti$_5$O$_{12}$ type spinel structure single phase, and no impurity phase was present in the particles. Further, it was also confirmed that the particles had a BET specific surface area of 7.5 m$^2$/g.

The lithium titanate particles were used as a positive electrode active substance to produce a coin cell. As a result, it was confirmed that the obtained coin cell had an initial discharge capacity of 166 mAh/g and an output characteristic (high-efficiency discharge capacity retention rate) of 76.7%.

Examples 3-2 to 3-5

The same procedure as in Example 3-1 was conducted except that the kind of titanium oxide, Li/Ti charge ratio upon aging reaction, aging temperature and heat-calcination treatment temperature were changed variously, thereby obtaining lithium titanate particles.

Comparative Example 3-1

In Comparative Example 3-1, titanium oxide (anatase type) particles, lithium carbonate particles and magnesium hydroxide particles were charged and compound with each other such that an Li/Ti ratio (mol/mol) in the resulting composition was 0.80, and further fully mixed with each other using a mortar. The resulting mixed particles were placed in an alumina crucible and calcined in a muffle furnace at a temperature of 820° C. for 3 hr in an atmospheric air to obtain lithium titanate particles.

Comparative Example 3-2

In Comparative Example 3-2, the same procedure as in Example 2-1 was conducted except that titanium oxide (anatase type) particles having a specific surface area of 10 m²/g and a primary particle diameter of 10 nm were used, thereby obtaining lithium titanate particles. However, as a result of subjecting the thus obtained lithium titanate particles to X-ray diffraction analysis, it was confirmed that the particles comprised a large amount of titanium oxide (anatase type) as an impurity phase in addition to an $Li_4Ti_5O_{12}$ type spinel structure, and therefore failed to form a spinel structure single phase.

Comparative Examples 3-3 and 3-4

The same procedure as in Example 3-1 was conducted except that the reaction temperature upon aging reaction and heat-calcination treatment temperature were changed variously, thereby obtaining lithium titanate particles.

In Comparative Example 3-3, the aging reaction was conducted in the same conditions as in Example 3-1 except that the aging temperature was 45° C. After completion of the aging reaction, the obtained reaction suspension was cooled to room temperature and filtered using a nutsche, and then the resulting filter cake was dried at 120° C. and pulverized to obtain dry particles. As a result of subjecting the thus obtained dry particles to X-ray diffraction analysis, it was confirmed that only titanium oxide (oxide having an anatase type structure) was present in the dry particles, and no diffraction peak attributed to a lithium/titanium composite oxide having a rock salt type structure was observed. The dry particles were placed in an alumina crucible and calcined in a muffle furnace at a temperature of 670° C. for 3 hr in an atmospheric air to obtain lithium titanate particles. As a result of subjecting the thus obtained lithium titanate particles to X-ray diffraction analysis, it was confirmed that the particles comprised a slight amount of an $Li_4Ti_5O_{12}$ type spinel structure, but a large part of the particles was formed of titanium oxide (oxide having an anatase type structure).

Production conditions and various properties of the thus obtained lithium titanate particles are shown in Table 4.

TABLE 4

| Examples and Comp. Examples | Production of lithium titanate particles | | |
|---|---|---|---|
| | Reaction capacity (L) | Ti (IV) raw material | |
| | | Kind | BET specific surface area (m²/g) |
| Example 3-1 | 0.8 | TiO₂ (anatase) | 300 |
| Example 3-2 | 0.8 | TiO₂ (anatase) | 95 |
| Example 3-3 | 0.8 | TiO₂ (anatase) | 250 |
| Example 3-4 | 0.8 | TiO₂ (anatase) | 300 |
| Example 3-5 | 0.8 | TiO₂ (anatase) | 95 |
| Comp. Example 3-1 | — | TiO₂ (anatase) | 300 |
| Comp. Example 3-2 | 0.8 | TiO₂ (anatase) | 10 |
| Comp. Example 3-3 | 0.8 | TiO₂ (anatase) | 300 |
| Comp. Example 3-4 | 0.8 | TiO₂ (anatase) | 300 |

| Examples and Comp. Examples | Production of lithium titanate particles | | | |
|---|---|---|---|---|
| | Ti (IV) raw material | | Li raw material | |
| | Primary particle diameter (nm) | Amount added (g) | Kind | Li/Ti (—) |
| Example 3-1 | 6 | 72.77 | LiOH | 1.075 |
| Example 3-2 | 20 | 72.77 | LiOH | 1.075 |
| Example 3-3 | 10 | 72.77 | LiOH | 1.075 |
| Example 3-4 | 6 | 72.77 | LiOH | 1.100 |
| Example 3-5 | 20 | 72.77 | LiOH | 1.075 |
| Comp. Example 3-1 | 6 | — | Li₂CO₃ | 0.800 |
| Comp. Example 3-2 | 180 | 72.77 | LiOH | 1.075 |
| Comp. Example 3-3 | 6 | 72.77 | LiOH | 1.075 |
| Comp. Example 3-4 | 6 | 72.77 | LiOH | 1.075 |

| Examples and Comp. Examples | Production of lithium titanate particles | | |
|---|---|---|---|
| | Calcination treatment | | |
| | Aging temperature (° C.) | Calcination temperature (° C.) | Atmosphere |
| Example 3-1 | 95 | 670 | Air |
| Example 3-2 | 95 | 670 | Air |
| Example 3-3 | 95 | 650 | Air |
| Example 3-4 | 75 | 680 | Air |
| Example 3-5 | 95 | 700 | Air |
| Comp. Example 3-1 | — | 820 | Air |
| Comp. Example 3-2 | 95 | 670 | Air |
| Comp. Example 3-3 | 45 | 670 | Air |
| Comp. Example 3-4 | 95 | 500 | Air |

| Examples and Comp. Examples | Properties of lithium titanate particles | | | |
|---|---|---|---|---|
| | Crystal structure | BET specific surface area (m²/g) | Initial discharge capacity (mAh/g) | High-efficiency discharge capacity retention rate (%) |
| Example 3-1 | Spinel type | 7.5 | 166 | 76.7 |
| Example 3-2 | Spinel type | 10.5 | 171 | 79.3 |
| Example 3-3 | Spinel type | 8.5 | 168 | 77.7 |
| Example 3-4 | Spinel type | 7.1 | 165 | 75.8 |
| Example 3-5 | Spinel type | 9.1 | 170 | 78.2 |
| Comp. Example 3-1 | Spinel type | 3.5 | 161 | 50.3 |
| Comp. Example 3-2 | Spinel type + anatase type | 6.8 | 136 | 30.2 |
| Comp. Example 3-3 | Anatase type >> Spinel type | 7.4 | 121 | 35.9 |
| Comp. Example 3-4 | Spinel type + anatase type + Li₂TiO₃ | 14.3 | 128 | 38.2 |

As shown in the above Examples, the lithium titanate particles according to the present invention are capable of exhibiting both a high initial discharge capacity and a high output characteristic (high-efficiency discharge capacity retention rate). Therefore, the lithium titanate particles according to the present invention are suitable as an active substance for non-aqueous electrolyte secondary batteries.

Meanwhile, in the above Examples, the lithium titanate particles according to the present invention were used as a positive electrode active substance. However, even in the case where the lithium titanate particles according to the present invention are used as a negative electrode active substance, they can also exhibit excellent characteristics as an active substance for non-aqueous electrolyte secondary batteries.

Typical Examples of the Invention 4 are as follows.

Example 4-1

<Production of Mg-Containing Lithium Titanate Particles>

A suspension prepared by dispersing 0.911 mol of titanium oxide (anatase type) in 500 mL of ion-exchanged water was charged into a 1500 mL-capacity stainless steel container and gently stirred. Then, an aqueous solution prepared by dissolving 1.066 mol of lithium hydroxide in 200 mL of ion-exchanged water was added to the above suspension, and then an aqueous solution prepared by dissolving 0.070 mol of magnesium sulfate in 50 mL of ion-exchanged water was added to the obtained mixture to control a whole amount of the resulting reaction suspension to 800 mL. At this time, the Li/Ti ratio (mol/mol) in the suspension was 1.170, and the amount of magnesium sulfate added was 7.7 mol % based on Ti. The resulting mixed suspension was rapidly heated to 95° C. and subjected to aging reaction at that temperature for 6 hr. After completion of the aging reaction, the obtained reaction suspension was cooled to room temperature and filtered using a nutsche, and then the resulting filter cake was dried at 120° C. and then pulverized. As a result of subjecting the thus obtained dry particles to X-ray diffraction analysis, it was confirmed that the particles were in the form of a mixture comprising titanium oxide (anatase type) and a lithium/titanium composite oxide having a rock salt type structure. The dry particles were placed in an alumina crucible and calcined in a muffle furnace at a temperature of 670° C. for 3 hr in an atmospheric air to obtain Mg-containing lithium titanate particles.

As a result of subjecting the thus obtained Mg-containing lithium titanate particles to X-ray diffraction analysis, it was confirmed that the particles had an $Li_4Ti_5O_{12}$ type spinel structure single phase, and no impurity phase was present in the particles. Further, it was also confirmed that the particles had a BET specific surface area of 15.5 $m^2/g$, a lattice constant (a) of 8.3672 Å, and an Mg content (y) of 0.125 as calculated from the composition represented by the formula: $Li_xMg_yTi_zO_4$.

The Mg-containing lithium titanate particles were used as a positive electrode active substance to produce a coin cell. As a result, it was confirmed that the obtained coin cell had an initial discharge capacity of 162 mAh/g and an output characteristic (high-efficiency discharge capacity retention rate) of 83.9%.

Examples 4-2 to 4-4

The same procedure as in Example 4-1 was conducted except that the magnesium content was changed variously, thereby obtaining Mg-containing lithium titanate particles.

Example 4-5

The mixed suspension comprising titanium oxide (anatase type), lithium hydroxide and magnesium sulfate was subjected to aging reaction in the same manner as in Example 4-1. The obtained reaction product suspension was filtered using a nutsche to obtain a filter cake. Then, a water dispersion of acetylene black was added to the obtained filter cake, and the resulting mixture was fully kneaded to form a uniform kneaded material. The thus obtained kneaded material was dried at 120° C. and pulverized to obtain dry particles. At this time, the amount of the water dispersion of acetylene black added was 2.5% in terms of C based on a weight of titanium oxide as the raw material. The resulting dry particles were placed in a crucible and calcined therein at a temperature of 690° C. for 3 hr in a nitrogen gas atmosphere to obtain Mg-containing lithium titanate particles on the surface of which carbon was allowed to be present.

As a result of subjecting the thus obtained Mg-containing lithium titanate particles on the surface of which carbon was allowed to be present to X-ray diffraction analysis, it was confirmed that the particles had an $Li_4Ti_5O_{12}$ type spinel structure single phase, and no impurity phase was present in the particles. Further, it was also confirmed that the particles had a BET specific surface area of 30.5 $m^2/g$, a lattice constant (a) of 8.3669 Å, and an Mg content (y) of 0.125 as calculated from the composition represented by the formula: $Li_xMg_yTi_zO_4$. In addition, as a result of the measurement using "EMIA-820" manufactured by Horiba Seisakusho Co., Ltd., it was confirmed that the particles had a carbon content of 2.74% by weight.

The thus obtained Mg-containing lithium titanate particles on the surface of which carbon was allowed to be present were used as a positive electrode active substance to produce a coin cell. As a result, it was confirmed that the obtained coin cell had an initial discharge capacity of 163 mAh/g and an output characteristic (high-efficiency discharge capacity retention rate) of 86.8%.

Example 4-6

The same procedure as in Example 4-5 was conducted except that the raw magnesium material and kind of carbon were respectively changed, thereby obtaining Mg-containing lithium titanate particles on the surface of which carbon was allowed to be present.

Comparative Example 4-1

In Comparative Example 4-1, lithium titanate particles comprising no magnesium, titanium oxide (anatase type) particles and lithium carbonate particles were charged and compound with each other such that an Li/Ti ratio (mol/mol) in the resulting composition was 0.80, and further fully mixed with each other using a mortar. The resulting mixed particles were placed in an alumina crucible and calcined in a muffle furnace at a temperature of 720° C. for 3 hr in an atmospheric air to obtain particles.

Comparative Example 4-2

In Comparative Example 4-2, titanium oxide (anatase type) particles, lithium carbonate particles and magnesium hydroxide particles were charged and compound with each other such that an Li/Mg/Ti ratio (mol/mol/mol) in the resulting composition was 10/1/13, and further fully mixed with each other using a mortar. The resulting mixed particles were placed in an alumina crucible and calcined in a muffle furnace at a temperature of 720° C. for 3 hr in an atmospheric air to obtain particles.

Comparative Examples 4-3 and 4-4

The same procedure as in Example 4-1 was conducted except that the magnesium content was changed variously, thereby obtaining Mg-containing lithium titanate particles.

Production conditions are shown in Table 5, and various properties of the thus obtained Mg-containing lithium titanate particles are shown in Table 6.

Figure 5:
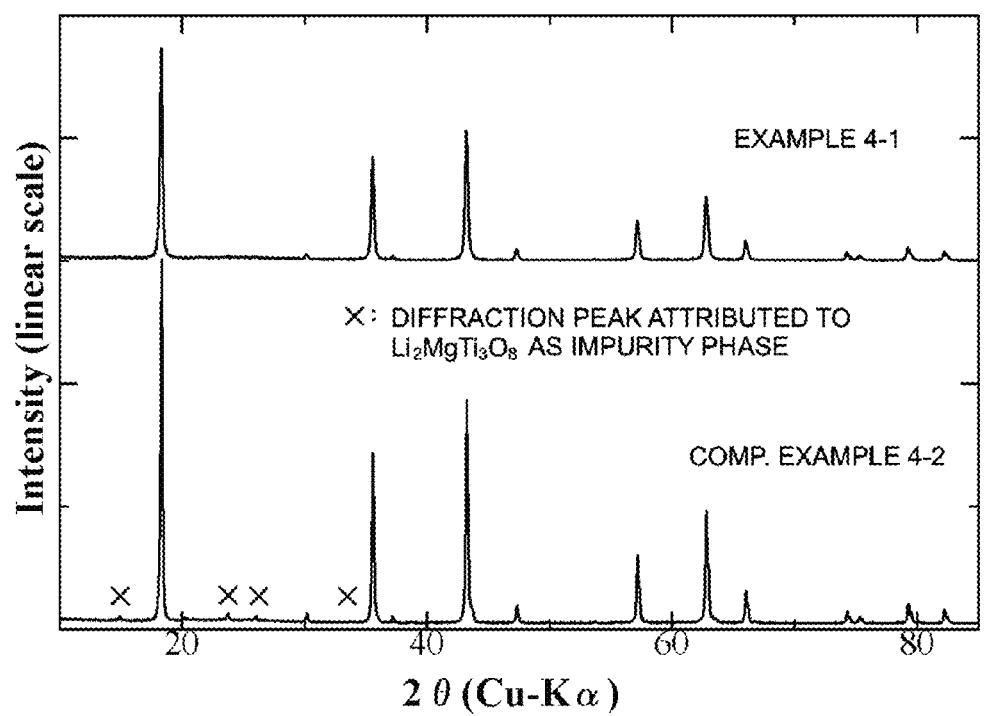
FIG. 5 is an X-ray diffraction pattern of Mg-containing lithium titanate particles obtained in Example 4-1 and Comparative Example 4-2.

FIG. 5 shows an X-ray diffraction pattern of the Mg-containing lithium titanate particles obtained in Example 4-1 and Comparative Example 4-2.

TABLE 5

| | Production of Mg-containing lithium titanate particles | | | |
|---|---|---|---|---|
| | Ti (IV) raw material | | Li raw material | |
| Examples and Comp. Examples | Kind | Concentration (mol/L) | Kind | Li/Ti (—) |
| Example 4-1 | $TiO_2$ (anatase) | 1.139 | LiOH | 1.17 |
| Example 4-2 | $TiO_2$ (anatase) | 1.139 | LiOH | 1.06 |
| Example 4-3 | $TiO_2$ (anatase) | 1.139 | LiOH | 1.14 |
| Example 4-4 | $TiO_2$ (anatase) | 1.139 | LiOH | 1.07 |
| Example 4-5 | $TiO_2$ (anatase) | 1.139 | LiOH | 1.17 |
| Example 4-6 | $TiO_2$ (anatase) | 1.139 | LiOH | 1.06 |
| Comp. Example 4-1 | $TiO_2$ (anatase) | — | $Li_2CO_3$ | 0.80 |
| Comp. Example 4-2 | $TiO_2$ (anatase) | — | $Li_2CO_3$ | 0.77 |
| Comp. Example 4-3 | $TiO_2$ (anatase) | 1.139 | LiOH | 1.17 |
| Comp. Example 4-4 | $TiO_2$ (anatase) | 1.139 | LiOH | 1.17 |

| | Production of Mg-containing lithium titanate particles | | |
|---|---|---|---|
| | Mg raw material | | Aging |
| Examples and Comp. Examples | Kind | Mg/Ti (mol %) | temperature (° C.) |
| Example 4-1 | $MgSO_4$ | 7.7 | 95 |
| Example 4-2 | $Mg(OH)_2$ | 7.7 | 95 |
| Example 4-3 | $MgCl_2$ | 3.0 | 95 |
| Example 4-4 | $Mg(OH)_2$ | 8.8 | 85 |
| Example 4-5 | $MgSO_4$ | 7.7 | 95 |
| Example 4-6 | $Mg(OH)_2$ | 7.7 | 95 |
| Comp. Example 4-1 | — | — | — |
| Comp. Example 4-2 | $Mg(OH)_2$ | 7.7 | — |
| Comp. Example 4-3 | $MgSO_4$ | 0.5 | 95 |
| Comp. Example 4-4 | $MgSO_4$ | 12.5 | 95 |

| | Production of Mg-containing lithium titanate particles | | | |
|---|---|---|---|---|
| | Carbon treatment | | | |
| | | Amount added in | Calcination treatment | |
| Examples and Comp. Examples | Carbon species | terms of C (%) | Calcination temperature | Atmosphere |
| Example 4-1 | None | None | 670 | Air |
| Example 4-2 | None | None | 620 | Air |
| Example 4-3 | None | None | 670 | Air |
| Example 4-4 | None | None | 630 | Air |
| Example 4-5 | Acetylene black | 2.5 | 690 | Nitrogen |
| Example 4-6 | Acetylene black | 3.5 | 660 | Nitrogen |
| Comp. Example 4-1 | — | — | 720 | Air |
| Comp. Example 4-2 | None | None | 720 | Air |
| Comp. Example 4-3 | None | None | 670 | Air |
| Comp. Example 4-4 | None | None | 670 | Air |

TABLE 6

| | Properties of Mg-containing lithium titanate particles: $Li_xMg_yTi_zO_4$ Compositional ratio | | |
|---|---|---|---|
| Examples and Comp. Examples | x | y | z |
| Example 4-1 | 1.250 | 0.125 | 1.625 |
| Example 4-2 | 1.250 | 0.125 | 1.625 |
| Example 4-3 | 1.300 | 0.050 | 1.650 |
| Example 4-4 | 1.238 | 0.143 | 1.619 |
| Example 4-5 | 1.250 | 0.125 | 1.625 |
| Example 4-6 | 1.250 | 0.125 | 1.625 |
| Comp. Example 4-1 | 1.333 | 0 | 1.667 |
| Comp. Example 4-2 | 1.250 | 0.125 | 1.625 |
| Comp. Example 4-3 | 1.328 | 0.008 | 1.664 |
| Comp. Example 4-4 | 1.200 | 0.200 | 1.600 |

| | Properties of Mg-containing lithium titanate particles: $Li_xMg_yTi_zO_4$ | | |
|---|---|---|---|
| Examples and Comp. Examples | Crystal structure | BET specific surface area (m²/g) | Lattice constant (a)(Å) |
| Example 4-1 | Spinel type | 15.5 | 8.3672 |
| Example 4-2 | Spinel type | 28.8 | 8.3677 |
| Example 4-3 | Spinel type | 10.8 | 8.3631 |
| Example 4-4 | Spinel type | 31.4 | 8.3703 |
| Example 4-5 | Spinel type | 16.5 | 8.3669 |
| Example 4-6 | Spinel type | 30.5 | 8.3672 |
| Comp. Example 4-1 | Spinel type | 5.7 | 8.3595 |
| Comp. Example 4-2 | Spinel type + $Li_2MgTi_3O_8$ | 6.8 | 8.3641 |
| Comp. Example 4-3 | Spinel type | 8.1 | 8.3601 |
| Comp. Example 4-4 | Spinel type + $Li_2MgTi_3O_8$ | 15.1 | 8.3788 |

| | Properties of Mg-containing lithium titanate particles: $Li_xMg_yTi_zO_4$ | | |
|---|---|---|---|
| Examples and Comp. Examples | Carbon content (%) | Initial discharge capacity (mAh/g) | High-efficiency discharge capacity retention rate (%) |
| Example 4-1 | — | 162 | 83.9 |
| Example 4-2 | — | 159 | 84.4 |
| Example 4-3 | — | 163 | 80.3 |
| Example 4-4 | — | 160 | 84.1 |
| Example 4-5 | 2.74 | 163 | 86.8 |
| Example 4-6 | 3.66 | 161 | 86.9 |
| Comp. Example 4-1 | — | 162 | 72.5 |
| Comp. Example 4-2 | — | 149 | 67.5 |
| Comp. Example 4-3 | — | 163 | 74.7 |
| Comp. Example 4-4 | — | 148 | 71.6 |

As shown in the above Examples, the Mg-containing lithium titanate particles according to the present invention are capable of exhibiting both a high initial discharge capacity and a high output characteristic (high-efficiency discharge capacity retention rate). Therefore, the Mg-containing lithium titanate particles according to the present invention are suitable as an active substance for non-aqueous electrolyte secondary batteries.

Meanwhile, in the above Examples, the Mg-containing lithium titanate particles according to the present invention were used as a positive electrode active substance. However, even in the case where the Mg-containing lithium titanate particles according to the present invention are used as a negative electrode active substance, they can also exhibit excellent characteristics as an active substance for non-aqueous electrolyte secondary batteries.

Industrial Applicability

The lithium titanate particles according to the Invention 1 are capable of exhibiting well-balanced battery characteristics including an excellent initial discharge capacity and a high output characteristic (high-efficiency discharge capacity retention rate) as well as suppressed generation of gases when used as negative electrode active substance particles in non-aqueous electrolyte secondary batteries, and therefore can be suitably used as active substance particles for non-aqueous electrolyte secondary batteries.

When the lithium titanate particles according to the Invention 2 are used as a negative electrode active substance in non-aqueous electrolyte secondary batteries, it is possible to obtain a non-aqueous electrolyte secondary battery having an excellent output characteristic (high-efficiency discharge capacity retention rate).

When using the lithium titanate particles produced by the production process according to the Invention 3, it is possible to obtain a non-aqueous electrolyte secondary battery capable of exhibiting an excellent initial discharge capacity and a high output characteristic (high-efficiency discharge capacity retention rate) as required for a secondary battery.

When using the Mg-containing lithium titanate particles according to the Invention 4, it is possible to obtain a non-aqueous electrolyte secondary battery capable of exhibiting an excellent initial discharge capacity and a high output characteristic (high-efficiency discharge capacity retention rate) as required for a secondary battery.

The invention claimed is:

1. Lithium titanate particles with a spinel structure comprising $TiO_2$ in an amount of not more than 1.5 mass %, $Li_2TiO_3$ in an amount of not less than 1 mass % and not more than 6 mass %, and $Li_4Ti_5O_{12}$ in an amount of not less than 94 mass % and not more than 99 mass % as determined according to a Rietveld analysis when indexed with Fd-3 m by XRD, and having a specific surface area of 7 to 15 $m^2/g$ as measured by BET method and a crystallite size of 80 to 200 nm.

2. The lithium titanate particles according to claim 1, wherein a ratio (molar ratio) of Li to Ti (Li/Ti) in the particles is 0.805 to 0.83.

3. A process for producing the lithium titanate particles as defined in claim 1, comprising the step of calcining a mixture comprising at least $Li_2TiO_3$ and $TiO_2$ at a temperature of not lower than 650° C. and lower than 800° C.

4. Negative electrode active substance particles comprising the lithium titanate particles as defined in claim 1.

5. The negative electrode active substance particles for non-aqueous electrolyte secondary batteries, wherein in a cell comprising the negative electrode active substance particles as defined in claim 4 and metallic lithium as a counter electrode, when a charging direction of the cell is the direction in which lithium is released, an initial discharge capacity of the cell is not less than 165 mAh/g, and an output characteristic of the cell as a discharge capacity ratio between 10 C and 0.1 C assuming that a C-rate upon measurement of the initial discharge capacity is 0.1 C is not less than 80%.

6. A non-aqueous electrolyte secondary battery comprising the negative electrode active substance particles as defined in claim 4.

* * * * *